United States Patent
Kitajima et al.

(10) Patent No.: US 9,546,234 B2
(45) Date of Patent: Jan. 17, 2017

(54) METAL FINE PARTICLE DISPERSANT, METAL FINE PARTICLE DISPERSION LIQUID, AND CURED FILM

(71) Applicant: HARIMA CHEMICALS, INCORPORATED, Kakogawa-shi, Hyogo (JP)

(72) Inventors: Yutaka Kitajima, Hyogo (JP); Tetsuya Harada, Hyogo (JP); Keiji Sasakura, Hyogo (JP)

(73) Assignee: HARIMA CHEMICALS, INCORPORATED, Hyogo (JP)

( * ) Notice: Subject to any disclaimer, the term of this patent is extended or adjusted under 35 U.S.C. 154(b) by 0 days.

(21) Appl. No.: 14/770,677

(22) PCT Filed: Jan. 16, 2014

(86) PCT No.: PCT/JP2014/050690
§ 371 (c)(1),
(2) Date: Aug. 26, 2015

(87) PCT Pub. No.: WO2014/132693
PCT Pub. Date: Sep. 4, 2014

(65) Prior Publication Data
US 2016/0002379 A1    Jan. 7, 2016

(30) Foreign Application Priority Data

Feb. 28, 2013  (JP) .............................. 2013-038176

(51) Int. Cl.
| | | |
|---|---|---|
| C08F 220/28 | (2006.01) | |
| C09D 4/00 | (2006.01) | |
| C09D 133/14 | (2006.01) | |
| C08L 33/14 | (2006.01) | |
| C08L 101/02 | (2006.01) | |
| C08F 220/18 | (2006.01) | |
| C08F 220/36 | (2006.01) | |
| C08F 220/40 | (2006.01) | |
| C08K 3/22 | (2006.01) | |
| C08K 9/02 | (2006.01) | |

(52) U.S. Cl.
CPC ........... *C08F 220/28* (2013.01); *C08F 220/18* (2013.01); *C08F 220/36* (2013.01); *C08F 220/40* (2013.01); *C08K 3/22* (2013.01); *C08L 33/14* (2013.01); *C08L 101/02* (2013.01); *C09D 4/00* (2013.01); *C09D 133/14* (2013.01); *C08F 2220/281* (2013.01); *C08F 2220/286* (2013.01); *C08K 9/02* (2013.01); *C08K 2003/2237* (2013.01); *C08K 2003/2244* (2013.01); *C08K 2003/2296* (2013.01)

(58) Field of Classification Search
CPC ..................................................... C08F 220/28
USPC ........................................................ 524/430
See application file for complete search history.

(56) References Cited

U.S. PATENT DOCUMENTS

2003/0209695 A1    11/2003    Tsuzuki et al.

FOREIGN PATENT DOCUMENTS

| EP | 1609825 A1 | 12/2005 |
|---|---|---|
| EP | 2058375 A2 | 5/2009 |
| EP | 2295505 A1 | 3/2011 |
| JP | 10-246955 A | 9/1998 |
| JP | 2001-220196 A | 8/2001 |
| JP | 2002-322206 | * 11/2002 |
| JP | 2002-322206 A | 11/2002 |
| JP | 2007-238643 A | 9/2007 |
| JP | 2007-289943 A | 11/2007 |
| JP | 2009-241063 A | 10/2009 |

OTHER PUBLICATIONS

Machine translation of JP 2002-322206.*
International Search Report (PCT/ISA/210) mailed on Mar. 25, 2014, by the Japanese Patent Office as the International Searching Authority for International Application No. PCT/JP2014/050690.
Written Opinion (PCT/ISA/237) mailed on Mar. 25, 2014, by the Japanese Patent Office as the International Searching Authority for International Application No. PCT/JP2014/050690.
PCT International Preliminary Report on Patentability (IPRP) and Written Opinion mailed on Sep. 11, 2015, in corresponding International Application No. PCT/JP2014/050690 (15 pages).

* cited by examiner

*Primary Examiner* — Doris Lee
(74) *Attorney, Agent, or Firm* — Buchanan, Ingersoll & Rooney PC

(57) ABSTRACT

A metal fine particle dispersant is obtained by reaction of a polymer (a) containing a first reactive functional group, an ionic group to be absorbed to metal fine particles, and a polyoxyalkylene side chain with a compound (b) containing a second reactive functional group to be bonded to the first reactive functional group and an active energy ray curable group to be cured by an active energy ray. A metal fine particle dispersion liquid containing the metal fine particle dispersant, metal fine particles, and a dispersion medium is prepared. The metal fine particle dispersion liquid is cured, thereby obtaining a cured film.

7 Claims, No Drawings

METAL FINE PARTICLE DISPERSANT, METAL FINE PARTICLE DISPERSION LIQUID, AND CURED FILM

TECHNICAL FIELD

The present invention relates to a metal fine particle dispersant, a metal fine particle dispersion liquid, and a cured film, to be specific, to a metal fine particle dispersant, a metal fine particle dispersion liquid prepared by dispersing metal fine particles by the metal fine particle dispersant, and a cured film obtained by curing the metal fine particle dispersion liquid.

BACKGROUND ART

Conventionally, various metal fine particles are dispersed in various coating agents so as to impart various properties such as mechanical properties, chemical resistance, high refractive index, antistatic properties, ultraviolet ray and infrared ray shielding properties, and excoriation resistance to a cured film obtained by applying the coating agent to be cured, or furthermore as a pigment or the like.

In such a coating agent, the metal fine particles may aggregate, depending on the kind of the metal fine particles, a solvent, a binder resin, or the like, which is blended. Thus, it has been proposed that a dispersant is added to the coating agent so as to excellently disperse the metal fine particles.

To be specific, a pigment dispersing resin having, as an active component, a copolymer obtained by polymerization of (1) 5 to 60 weight % of (meth)acrylate having a saturated alicyclic group composed of two or more rings; (2) 5 to 50 weight % of C10 to C35 alkyl (meth)acrylate; and (3) 0.1 to 30 weight % of polymerizable monomer having at least one functional group selected from a hydroxyl group, a carboxyl group, a tertiary amino group, a quaternary ammonium base, a sulfonate group, and a phosphate group, and a coating composition containing the pigment dispersing resin, a binder resin, a solvent, and a pigment have been, for example, proposed (ref: the following Patent Document 1).

Also, a metal oxide fine particle dispersant, which is a reaction product prepared by allowing a polymer of a vinyl compound having, in a molecule, an epoxy group to be subjected to addition reaction with a carboxyl group-containing (meth)acrylic compound and has a (meth)acrylic equivalent of 200 to 360 g/eq., a hydroxyl value of 150 to 270 mgKOH/g, and a weight average molecular weight of 8000 to 50000, has been, for example, proposed (ref: the following Patent Document 2).

CITATION LIST

Patent Document

Patent Document 1: Japanese Unexamined Patent Publication No. 2007-238643
Patent Document 2: Japanese Unexamined Patent Publication No. 2007-289943

SUMMARY OF THE INVENTION

Problem to be Solved by the Invention

Meanwhile, further improved dispersibility is required for the above-described dispersing resin.

Also, further improved various properties such as chemical resistance and hardness are required for the cured film obtained by curing the coating composition.

An object of the present invention is to provide a metal fine particle dispersant that has excellent dispersibility of metal fine particles and is capable of achieving improvement of various properties of a cured film, a metal fine particle dispersion liquid that is prepared by dispersing the metal fine particles by the metal fine particle dispersant, and a cured film that is obtained by curing the metal fine particle dispersion liquid.

Means for Solving the Problem

A metal fine particle dispersant of the present invention is obtained by reaction of a polymer (a) with a compound (b), wherein the polymer (a) contains a first reactive functional group, an ionic group to be absorbed to metal fine particles, and a polyoxyalkylene side chain and the compound (b) contains a second reactive functional group to be bonded to the first reactive functional group and an active energy ray curable group to be cured by an active energy ray.

In the metal fine particle dispersant of the present invention, it is preferable that the first reactive functional group is at least one kind selected from the group consisting of a hydroxyl group, a glycidyl group, an isocyanate group, a carboxyl group, and a phosphate group and the second reactive functional group is at least one kind selected from the group consisting of an isocyanate group, a carboxyl group, a hydroxyl group, a glycidyl group, and a phosphate group.

In the metal fine particle dispersant of the present invention, it is preferable that the ionic group is at least one kind selected from the group consisting of a carboxyl group, a tertiary amino group, a quaternary ammonium group, and a phosphate group.

Examples of the azo compound include azobisisobutyronitrile, azobisdimethylvaleronitrile, azobiscyclohexanenitrile, 1,1'-azobis(1-acetoxy-1-phenylethane), dimethyl-2,2'-azobisisobutyrate, and 4,4'-azobis-4-cyanovaleric acid.

In the metal fine particle dispersant of the present invention, it is preferable that the polymer (a) is obtained by allowing a first reactive functional group-containing monomer containing the first reactive functional group, an ionic group-containing monomer containing the ionic group, a polyoxyalkylene group-containing monomer containing a polyoxyalkylene group, and a copolymerizable monomer copolymerizable with these to react and with respect to 100 parts by mass of the total amount of the first reactive functional group-containing monomer, the ionic group-containing monomer, the polyoxyalkylene group-containing monomer, and the copolymerizable monomer, the mixing ratio of the first reactive functional group-containing monomer is 1 part by mass or more and 35 parts by mass or less; the mixing ratio of the ionic group-containing monomer is 1 part by mass or more and 20 parts by mass or less; and the mixing ratio of the polyoxyalkylene group-containing monomer is 0.1 parts by mass or more and 50 parts by mass or less.

In the metal fine particle dispersant of the present invention, it is preferable that the copolymerizable monomer contains a saturated alicyclic group-containing monomer containing a saturated alicyclic group composed of two or more rings and with respect to 100 parts by mass of the total amount of the first reactive functional group-containing monomer, the ionic group-containing monomer, the polyoxyalkylene group-containing monomer, and the copolymerizable monomer, the mixing ratio of the saturated alicyclic group-containing monomer is 0.1 parts by mass or more and 50 parts by mass or less.

A metal fine particle dispersion liquid of the present invention contains the above-described metal fine particle dispersant, metal fine particles, and a dispersion medium.

The solvent is not particularly limited as long as it is stable with respect to the above-described monomers. Examples of the solvent include organic solvents such as petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetamide, dimethylsulfoxide, N-methylpyrrolidone, and pyridine.

The metal fine particle dispersant of the present invention has the polyoxyalkylene side chain contained in the polymer (a) and by the reaction of the first reactive functional group in the polymer (a) with the second reactive functional group in the compound (b), the active energy ray curable group is introduced thereto.

Thus, according to the metal fine particle dispersant of the present invention and the metal fine particle dispersion liquid of the present invention containing the metal fine particle dispersant of the present invention, improvement of the dispersibility of the metal fine particles can be achieved and the metal fine particle dispersant can be cured by application of the active energy ray.

Furthermore, the cured film of the present invention obtained by curing the metal fine particle dispersion liquid of the present invention has excellent various properties such as chemical resistance and hardness.

DESCRIPTION OF EMBODIMENTS

A metal fine particle dispersant (i.e. dispersing agent for metal fine particles) of the present invention is obtained by reaction of a polymer (a) with a compound (b).

The polymer (a) is, for example, a polymer obtained by polymerization of an ethylenically unsaturated bond-containing monomer (described later) and has, in a molecule, a first reactive functional group, an ionic group to be absorbed to metal fine particles, and a polyoxyalkylene side chain.

The first reactive functional group is a functional group to be bonded to a second reactive functional group (described later) in the compound (b) and is appropriately selected in accordance with the kind of the second reactive functional group (described later).

To be specific, examples of the first reactive functional group include a hydroxyl group, a glycidyl group, an isocyanate group, a carboxyl group, and a phosphate group. In view of easy reaction, preferably, a hydroxyl group, a glycidyl group, an isocyanate group, and a carboxyl group are used, more preferably, a hydroxyl group, an isocyanate group, and a carboxyl group are used, or further more preferably, a hydroxyl group and an isocyanate group are used.

These first reactive functional groups may be used alone or in combination of two or more.

An average content of the first reactive functional group is appropriately set in accordance with the purpose and intended use.

The ionic group is a functional group to allow the metal fine particle dispersant to be absorbed to metal fine particles (described later). A known ionic group is used without particular limitation.

To be specific, examples of the ionic group include anionic groups such as a carboxyl group and a phosphate group and cationic groups such as a tertiary amino group and a quaternary ammonium group.

The tertiary amino group is not particularly limited and an example thereof includes N,N-dialkylamino such as N,N-dimethylamino, N,N-diethylamino, N,N-dipropylamino, N,N-diisopropylamino, N,N-dibutylamino, N,N-di-isobutylamino, N,N-di-s-butylamino, and N,N-di-t-butylamino.

An example of the quaternary ammonium group includes a component obtained by allowing a quaternizing agent such as epihalohydrin, benzyl halide, and alkyl halide to act on the above-described tertiary amino group.

As the ionic group, preferably, a carboxyl group, a tertiary amino group, and a quaternary ammonium group are used.

These ionic groups may be used alone or in combination of two or more.

The first reactive functional group and the ionic group may be the same kind of functional group.

That is, the first reactive functional group is appropriately selected in accordance with the kind of the second reactive functional group (described later). A functional group that is capable of being used as both the first reactive functional group and the ionic group may be selected, depending on the kind of the second reactive functional group (described later).

To be more specific, when the glycidyl group is selected as the second reactive functional group (described later), for example, the carboxyl group and/or the phosphate group may be selected as the first reactive functional group. The carboxyl group and/or the phosphate group are/is a functional group that can be also used as the ionic group.

In such a case, an excess amount of the functional group (carboxyl group and/or phosphate group) is used, compared to an amount (equivalent) required for reaction with the second reactive functional group (described later).

The functional group of an amount (equivalent) required for the reaction with the second reactive functional group (described later) is classified as the first reactive functional group and the functional group of the excess amount is classified a's the ionic group.

In the present invention, in view of excellently dispersing the metal fine particles, preferably, the first reactive functional group and the ionic group are appropriately selected so as not to be overlapped with each other.

An average content of the ionic group is appropriately set in accordance with the purpose and intended use.

The polyoxyalkylene side chain is formed by allowing a polyoxyalkylene group having, as a repeating unit, an oxyalkylene unit ($C_nH_{2n}O$) to be contained in the polymer (a) as a side chain.

The polyoxyalkylene group is, for example, represented by the following general formula (1).

[Chemical Formula 1]

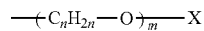

(In general formula (1), "n" represents an integer of 1 to 4, "m" represents an integer of 2 or more, and X represents a hydrogen atom or an alkyl group.)

In general formula (1), "n" is 1 or more, preferably 2 or more and 4 or less, preferably 3 or less.

To be specific, examples of the oxyalkylene unit contained in the polyoxyalkylene group include a polyoxyethylene unit (in general formula (1), corresponding to "n"=2), a polyoxypropylene unit (in general formula (1), corresponding to "n"=3), and a random, block, or graft unit thereof. Preferably, a polyoxyethylene unit and a polyoxypropylene unit are used, or more preferably, a polyoxyethylene unit is used.

In the above-described general formula (1), "m" represents the number of repeating unit of the oxyalkylene unit and is 2 or more, preferably 3 or more, more preferably 4 or more, and for example, 40 or less, preferably 30 or less, more preferably 15 or less.

When the number of repeating unit of the oxyalkylene unit is within the above-described range, the obtained metal fine particle dispersant effectively suppresses reaggregation of the metal fine particles, so that the storage stability of a metal fine particle dispersion liquid containing the metal fine particle dispersant is improved and furthermore, improvement of the transparency, which is caused by refinement of the metal fine particles, of the cured film obtained by curing the metal fine particle dispersion liquid can be achieved.

In the above-described general formula (1), X is an end portion of the polyoxyalkylene group and represents a hydrogen atom or an alkyl group.

An example of the alkyl group includes an alkyl group having 1 to 4 carbon atoms such as methyl, ethyl, propyl, isopropyl, butyl, isobutyl, s-butyl, and t-butyl. Preferably, an alkyl group having the same number of carbon atoms as that (number of "n" in the above-described general formula (1)) of the oxyalkylene unit is used.

A molecular weight of the polyoxyalkylene group is appropriately set in accordance with the purpose and intended use.

These polyoxyalkylene groups may be used alone or in combination of two or more.

An average content of the polyoxyalkylene group is appropriately set in accordance with the purpose and intended use.

The polymer (a) may have another group (group excluding the first reactive functional group, the ionic group, and the polyoxyalkylene group) as needed.

To be specific, an example of another group includes a saturated alicyclic group composed of two or more rings.

The saturated alicyclic group composed of two or more rings is a saturated alicyclic group in which a cyclic structure such as a polycyclic, cross-linking cyclic, or spirocyclic structure is formed by two or more rings. The saturated alicyclic group composed of two or more rings is introduced into the polymer (a) so as to improve the dispersibility of the metal fine particles.

Examples of the saturated alicyclic group composed of two or more rings include a bicyclo group, a tricyclo group, and a tetracyclo group. Preferably, a bicyclo group and a tricyclo group are used.

To be specific, examples of the bicyclo group include bornyl, isobornyl, and dicyclopentanyl. To be specific, examples of the tricyclo group include adamantyl and dimethyl adamantyl.

These saturated alicyclic groups composed of two or more rings may be used alone or in combination of two or more.

When the saturated alicyclic group composed of two or more rings is introduced into the polymer (a), improvement of the dispersibility can be achieved and furthermore, when an organic solvent, a binder resin, and the like are blended in the metal fine particle dispersion liquid, improvement of the compatibility with these can be achieved.

When the saturated alicyclic group composed of two or more rings is contained, an average content thereof is appropriately set in accordance with the purpose and intended use.

In addition to the above-described saturated alicyclic group composed of two or more rings, for example, the polymer (a) may contain various groups such as an aliphatic group (e.g., alkyl group, cycloalkyl group, etc.) and an aromatic group (e.g., phenyl group etc.) as another group.

The polymer (a) can be, for example, produced by copolymerizing the ethylenically unsaturated bond-containing monomer that contains the above-described groups.

The ethylenically unsaturated bond-containing monomer, which is a material of the polymer (a), is a compound that has, in one molecule, one or more ethylenically unsaturated double bonds. An example thereof includes a vinyl monomer.

The vinyl monomer is a monomer having a vinyl group. Preferably, (meth)acrylate and a derivative thereof are used. (Meth)acryl includes acryl and methacryl.

In the production of the polymer (a), when the (meth) acrylate and the derivative thereof are used as a main component, an acrylic polymer can be obtained as the polymer (a). The acrylic polymer is excellent in production efficiency, so that when the polymer (a) is the acrylic polymer, improvement of the production efficiency of the metal fine particle dispersant can be achieved.

To be more specific, to obtain the polymer (a), for example, as the ethylenically unsaturated bond-containing monomer (preferably, (meth)acrylate and a derivative thereof), the first reactive functional group-containing monomer containing the first reactive functional group, the ionic group-containing monomer containing the ionic group, and the polyoxyalkylene group-containing monomer containing a polyoxyalkylene group are allowed to react. Also, along with the above-described components, a copolymerizable monomer that is copolymerizable with these can be allowed to react as needed.

Examples of the first reactive functional group-containing monomer include a hydroxyl group-containing monomer, a glycidyl group-containing monomer, an isocyanate group-containing monomer, a carboxyl group-containing monomer, and a phosphate group-containing monomer.

An example of the hydroxyl group-containing monomer includes hydroxyl group-containing (meth)acrylate such as hydroxymethyl (meth)acrylate, 2-hydroxyethyl (meth)acrylate, 3-hydroxypropyl (meth)acrylate, 1-methyl-2-hydroxyethyl (meth)acrylate, 2-hydroxypropyl (meth)acrylate, and 4-hydroxybutyl (meth)acrylate. Preferably, 2-hydroxyethyl (meth)acrylate is used.

An example of the glycidyl group-containing monomer includes glycidyl group-containing (meth)acrylate such as glycidyl (meth)acrylate, 4-hydroxybutyl (meth)acrylate glycidyl ether, and allyl glycidyl ether. Preferably, glycidyl (meth)acrylate is used.

An example of the isocyanate group-containing monomer includes isocyanate group-containing (meth)acrylate such as isocyanatomethyl (meth)acrylate, 2-isocyanatoethyl (meth) acrylate, 3-isocyanatopropyl (meth)acrylate, 1-methyl-2-isocyanatoethyl (meth)acrylate, 2-isocyanatopropyl (meth) acrylate, and 4-isocyanatobutyl (meth)acrylate. Preferably, 2-isocyanatoethyl (meth)acrylate is used.

Examples of the carboxyl group-containing monomer include α,β-unsaturated carboxylic acid such as (meth) acrylic acid, itaconic acid, maleic acid, and fumaric acid or a salt thereof and a half-esterified compound of the above-described hydroxyalkyl (meth)acrylate and acid anhydride. Preferably, α,β-unsaturated carboxylic acid is used, or more preferably (meth)acrylic acid is used.

An example of the phosphate group-containing monomer includes phosphate group-containing (meth)acrylate such as acid phosphooxyethyl (meth)acrylate and mono(2-hydroxyethyl (meth)acrylate)phosphate. Preferably, mono(2-hydroxyethyl (meth)acrylate)phosphate is used.

These first reactive functional group-containing monomers may be used alone or in combination of two or more. When the first reactive functional group-containing monomers are used in combination of two or more, the kind of the first reactive functional group-containing monomer is appropriately selected so that the first reactive functional groups thereof are not bonded to each other. As the first reactive functional group-containing monomer, in view of easy reaction, preferably, a hydroxyl group-containing monomer, a glycidyl group-containing monomer, an isocyanate group-containing monomer, and a carboxyl group-containing monomer are used, more preferably, a hydroxyl group-containing monomer, an isocyanate group-containing monomer, and a carboxyl group-containing monomer are used, or further more preferably, a hydroxyl group-containing monomer and an isocyanate group-containing monomer are used.

Examples of the ionic group-containing monomer include a carboxyl group-containing monomer, a tertiary amino group-containing monomer, a quaternary ammonium group-containing monomer, and a phosphate group-containing monomer.

An example of the carboxyl group-containing monomer includes the same carboxyl group-containing monomer as that in the above-described first reactive functional group-containing monomer.

Examples of the tertiary amino group-containing monomer include N,N-dialkylaminoalkyl (meth)acrylate such as N,N-dimethylaminoethyl (meth)acrylate, N,N-diethylaminoethyl (meth)acrylate, N,N-dimethylaminopropyl (meth)acrylate, N,N-di-t-butylamino ethyl (meth)acrylate, and N,N-dimethylaminobutyl (meth)acrylate and N,N-dialkylaminoalkyl (meth)acrylamide such as N,N-dimethylaminoethyl (meth)acrylamide, N,N-diethylaminoethyl (meth)acrylamide, and N,N-dimethylaminopropyl (meth)acrylamide. Preferably, N,N-dialkylaminoalkyl (meth)acrylate is used, or more preferably N,N-dimethylaminoethyl (meth)acrylate is used.

The quaternary ammonium group-containing monomer is a component obtained by allowing a quaternizing agent (e.g., epihalohydrin, benzyl halide, alkyl halide, etc.) to act on the above-described tertiary amino group-containing monomer. To be specific, examples thereof include (meth)acryloyloxy alkyltrialkyl ammonium salt such as 2-(methacryloyloxy)ethyl trimethylammonium chloride, 2-(methacryloyloxy)ethyl trimethylammonium bromide, and 2-(methacryloyloxy)ethyl trimethyl ammonium dimethylphosphate; (meth)acryloylaminoalkyltrialkyl ammonium salt such as methacryloylamino propyl trimethyl ammonium chloride and methacryloylamino propyl trimethyl ammonium bromide; tetraalkyl (meth)acrylate such as tetrabutyl ammonium (meth)acrylate; and trialkylbenzylammonium (meth)acrylate such as trimethylbenzylammonium (meth)acrylate. Preferably, (meth)acryloyloxy alkyltrialkyl ammonium salt is used, or more preferably, 2-(methacryloyloxy)ethyl trimethylammonium chloride is used.

An example of the phosphate group-containing monomer includes the same phosphate group-containing monomer as that in the above-described first reactive functional group-containing monomer.

These ionic group-containing monomers may be used alone or in combination of two or more.

As the ionic group-containing monomer, preferably, a carboxyl group-containing monomer, a tertiary amino group-containing monomer, and a quaternary ammonium group-containing monomer are used.

An example of the polyoxyalkylene group-containing monomer includes polyoxyalkylene group-containing (meth)acrylate having a hydroxyl group (X in the above-described general formula (1) is a hydrogen atom) at one end such as polyoxyalkylene (meth)acrylate including polyoxyethylene (meth)acrylate, polyoxypropylene (meth)acrylate, and polyoxyethylene polyoxypropylene (meth)acrylate.

As the polyoxyalkylene group-containing monomer, preferably, polyoxyethylene (meth)acrylate and polyoxypropylene (meth)acrylate are used.

To be specific, examples of the polyoxyethylene (meth)acrylate include diethylene glycol mono(meth)acrylate, triethylene glycol mono(meth)acrylate, tetraethylene glycol mono(meth)acrylate, pentaethylene glycol mono(meth)acrylate, hexaethylene glycol mono(meth)acrylate, heptaethylene glycol mono(meth)acrylate, octaethylene glycol mono(meth)acrylate, nonaethylene glycol mono(meth)acrylate, decaethylene glycol mono(meth)acrylate, undecaethylene glycol mono(meth)acrylate, dodecaethylene glycol mono(meth)acrylate, and tridecaethylene glycol mono(meth)acrylate.

To be specific, examples of the polyoxypropylene (meth)acrylate include dipropylene glycol mono(meth)acrylate, tripropylene glycol mono(meth)acrylate, tetrapropylene glycol mono(meth)acrylate, pentapropylene glycol mono(meth)acrylate, hexapropylene glycol mono(meth)acrylate, heptapropylene glycol mono(meth)acrylate, octapropylene glycol mono(meth)acrylate, nonapropylene glycol mono(meth)acrylate, decapropylene glycol mono(meth)acrylate, undecapropylene glycol mono(meth)acrylate, dodecapropylene glycol mono(meth)acrylate, and tridecapropylene glycol mono(meth)acrylate.

As the polyoxyalkylene group-containing monomer, in addition to the above-described polyoxyalkylene group-containing (meth)acrylate having a hydroxyl group at one end, for example, polyoxyalkylene group-containing (meth)acrylate having an alkoxy group (X in the above-described general formula (1) is an alkyl group) at one end is used.

Examples of the polyoxyalkylene group-containing (meth)acrylate having an alkoxy group at one end include ethoxyethoxyethyl (meth)acrylate, methoxyethoxyethyl (meth)acrylate, propoxypropoxypropyl (meth)acrylate, ethoxypropoxypropyl (meth)acrylate, methoxypropoxypropyl (meth)acrylate, butoxybutoxybutyl (meth)acrylate, propoxybutoxybutyl (meth)acrylate, ethoxybutoxybutyl (meth)acrylate, and methoxybutoxybutyl (meth)acrylate.

Other examples of the polyoxyalkylene group-containing (meth)acrylate having an alkoxy group at one end include methoxydiethylene glycol mono(meth)acrylate, methoxytriethylene glycol mono(meth)acrylate, methoxytetraethylene glycol mono(meth)acrylate, methoxypentaethylene glycol mono(meth)acrylate, methoxyhexaethylene glycol mono(meth)acrylate, methoxyheptaethylene glycol mono(meth)acrylate, methoxyoctaethylene glycol mono(meth)acrylate, methoxynonaethylene glycol mono(meth)acrylate, methoxydecaethylene glycol mono(meth)acrylate, methoxyundecaethylene glycol mono(meth)acrylate, methoxydodecaethylene glycol mono(meth)acrylate, and methoxytridecaethylene glycol mono(meth)acrylate.

These polyoxyalkylene group-containing monomers may be used alone or in combination of two or more.

As the polyoxyalkylene group-containing monomer, preferably, polyoxyalkylene group-containing (meth)acrylate having a hydroxyl group (X in the above-described general formula (1) is a hydrogen atom) at one end is used.

As the copolymerizable monomer, for example, a saturated alicyclic group-containing monomer having a saturated alicyclic group composed of two or more rings is used.

Examples of the saturated alicyclic group-containing monomer having a saturated alicyclic group composed of two or more rings include (meth)acrylate having a bicyclo group, (meth)acrylate having a tricyclo group, and (meth)acrylate having a tetracyclo group. Preferably, (meth)acrylate having a bicyclo group and (meth)acrylate having a tricyclo group are used.

Examples of the (meth)acrylate having a bicyclo group include bornyl (meth)acrylate, isobornyl (meth)acrylate, and dicyclopentanyl (meth)acrylate. These (meth)acrylates having a bicyclo group may be used alone or in combination of two or more.

Examples of the (meth)acrylate having a tricyclo group include adamantyl (meth)acrylate and dimethyladamantyl (meth)acrylate. These (meth)acrylates having a tricyclo group may be used alone or in combination of two or more.

These saturated alicyclic group-containing monomers having a saturated alicyclic group composed of two or more rings may be used alone or in combination of two or more.

As the saturated alicyclic group-containing monomer having a saturated alicyclic group composed of two or more rings, preferably, (meth)acrylate having a bicyclo group is used, or more preferably, isobornyl (meth)acrylate is used.

As the copolymerizable monomer, in addition to the above-described saturated alicyclic group-containing monomer having a saturated alicyclic group composed of two or more rings, for example, an alkyl (meth)acrylate monomer and an aromatic ethylenically unsaturated monomer are used.

An example of the alkyl (meth)acrylate monomer includes a straight-chain, branched, or cyclic alkyl (meth)acrylate monomer having 1 to 30 carbon atoms such as methyl (meth)acrylate, ethyl (meth)acrylate, n-propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, tridecyl (meth)acrylate, tetradecyl (meth)acrylate, 1-methyltridecyl (meth)acrylate, hexadecyl (meth)acrylate, octadecyl (meth)acrylate, stearyl (meth)acrylate, isostearyl (meth)acrylate, eicosyl (meth)acrylate, docosyl (meth)acrylate, behenyl (meth)acrylate, tetracosyl (meth)acrylate, triacontyl (meth)acrylate, and cyclohexyl (meth)acrylate.

Examples of the aromatic ethylenically unsaturated monomer include styrene, α-methyl styrene, o-methyl styrene, m-methyl styrene, p-methyl styrene, and p-tert-butyl styrene.

Furthermore, examples of the copolymerizable monomer include itaconic acid ester such as benzyl itaconate, maleic acid ester such as dimethyl maleate, fumaric acid ester such as dimethyl fumarate, acrylonitrile, methacrylonitrile, and vinyl acetate.

These copolymerizable monomers may be used alone or in combination of two or more.

As the copolymerizable monomer, preferably, a saturated alicyclic group-containing monomer having a saturated alicyclic group composed of two or more rings, an alkyl (meth)acrylate monomer, and an aromatic ethylenically unsaturated monomer are used.

When the saturated alicyclic group-containing monomer having a saturated alicyclic group composed of two or more rings is used, the saturated alicyclic group composed of two or more rings can be introduced into the polymer (a), so that improvement of the dispersibility of the metal fine particles can be achieved. Furthermore, when an organic solvent, a binder resin, and the like are blended in the metal fine particle dispersion liquid, improvement of the compatibility with these can be achieved.

When the alkyl (meth)acrylate monomer and the aromatic ethylenically unsaturated monomer are used, a glass transition temperature of the polymer (a) can be adjusted in a desired range and furthermore, when an organic solvent, a binder resin, and the like are blended in the metal fine particle dispersion liquid, improvement of the compatibility with these can be achieved.

To synthesize the polymer (a), the above-described monomers (the first reactive functional group-containing monomer, the ionic group-containing monomer, the polyoxyalkylene group-containing monomer, and furthermore, if necessary, the above-described copolymerizable monomer) are blended and heated under the presence of a polymerization initiator and a solvent to be polymerized by a known method.

As the mixing ratio of the above-described monomers, with respect to 100 parts by mass of the total amount of the first reactive functional group-containing monomer, the ionic group-containing monomer, the polyoxyalkylene group-containing monomer, and the copolymerizable monomer, the mixing ratio of the first reactive functional group-containing monomer is, for example, 1 part by mass or more, preferably 2 parts by mass or more, and for example, 35 parts by mass or less, preferably 20 parts by mass or less; the mixing ratio of the ionic group-containing monomer is, for example, 1 part by mass or more, preferably 5 parts by mass or more, and for example, 20 parts by mass or less, preferably 18 parts by mass or less; and the mixing ratio of the polyoxyalkylene group-containing monomer is, for example, 0.1 parts by mass or more, preferably 5 parts by mass or more, and for example, 50 parts by mass or less, preferably 30 parts by mass or less.

By setting the mixing ratio of the first reactive functional group-containing monomer to be the above-described lower limit or more, a cured film having excellent hardness and chemical resistance can be formed. Meanwhile, by setting the mixing ratio of the first reactive functional group-containing monomer to be the above-described upper limit or less, gelation at the time of resin production can be suppressed.

By setting the mixing ratio of the ionic group-containing monomer to be the above-described lower limit or more, dispersibility of the metal fine particles is improved and reaggregation of the metal fine particles can be suppressed. Meanwhile, by setting the mixing ratio of the ionic group-containing monomer to be the above-described upper limit or less, improvement of various properties such as chemical resistance (particularly, alkali resistance) and hardness of the cured film can be achieved.

By setting the mixing ratio of the polyoxyalkylene group-containing monomer to be the above-described lower limit or more, dispersibility of the metal fine particles is improved and reaggregation of the metal fine particles can be suppressed. Furthermore, improvement of the transparency of the cured film can be achieved. Meanwhile, by setting the mixing ratio of the polyoxyalkylene group-containing monomer to be the above-described upper limit or less, improvement of various properties such as chemical resistance and hardness of the cured film can be achieved.

The mixing ratio of the copolymerizable monomer is not particularly limited and can be appropriately set so as to satisfy the required properties as the metal fine particle dispersant.

When the copolymerizable monomer contains a saturated alicyclic group-containing monomer having a saturated alicyclic group composed of two or more rings, the mixing ratio thereof with respect to 100 parts by mass of the total amount of the first reactive functional group-containing monomer, the ionic group-containing monomer, the polyoxyalkylene group-containing monomer, and the copolymerizable monomer is, for example, 0.1 parts by mass or more, preferably 3 parts by mass or more, and for example, 50 parts by mass or less, preferably 40 parts by mass or less.

When the mixing ratio of the saturated alicyclic group-containing monomer having a saturated alicyclic group composed of two or more rings is within the above-described range, an introduction amount of the saturated alicyclic group composed of two or more rings can be adjusted to be an appropriate ratio. Thus, improvement of the solubility with respect to an organic solvent can be achieved and improvement of the dispersibility of the metal fine particles can be achieved.

The polymerization initiator is not particularly limited and can be appropriately selected in accordance with the purpose and intended use. To be specific, an example of the polymerization initiator includes a radical polymerization initiator.

Examples of the radical polymerization initiator include an azo compound, a peroxide compound, sulfides, sulfines, sulfinic acids, a diazo compound, and a redox compound. Preferably, an azo compound and a peroxide compound are used.

Examples of the azo compound include azobisisobutyronitrile, azobisdimethylvaleronitrile, azobiscyclohexanenitrile, 1,1'-azobis(1-acetoxy-1-phenylethane), dimethyl-2,2'-azobisisobutylate, and 4,4'-azobis-4-cyanovaleric acid.

Examples of the peroxide compound include organic peroxides such as benzoyl peroxide, lauroyl peroxide, acetyl peroxide, caprylyl peroxide, 2,4-dichlorobenzoyl peroxide, isobutyl peroxide, acetylcyclohexylsulfonyl peroxide, t-butyl peroxypivalate, t-butylperoxy-2-ethylhexanoate, 1,1-di-t-butylperoxy cyclohexane, 1,1-di-t-butylperoxy-3,3,5-trimethylcyclohexane, 1,1-di-t-hexylperoxy-3,3,5-trimethylcyclohexane, isopropyl peroxy dicarbonate, isobutyl peroxy dicarbonate, s-butyl peroxy dicarbonate, n-butyl peroxy dicarbonate, 2-ethylhexyl peroxy dicarbonate, bis(4-t-butylcyclohexyl)peroxy dicarbonate, t-amylperoxy-2-ethylhexanoate, 1,1,3,3-tetramethylbutylperoxy-ethylhexanoate, 1,1,2-trimethylpropylperoxy-2-ethylhexanoate, t-butylperoxy isopropyl monocarbonate, t-amylperoxy isopropyl monocarbonate, t-butylperoxy-2-ethylhexyl carbonate, t-butylperoxy allyl carbonate, t-butylperoxy isopropyl carbonate, 1,1,3,3-tetramethyl butylperoxy isopropyl monocarbonate, 1,1,2-trimethylpropylperoxy isopropyl monocarbonate, 1,1,3,3-tetramethylbutylperoxy isononanoate, 1,1,2-trimethylpropylperoxy-isononanoate, and t-butylperoxy benzoate.

These polymerization initiators may be used alone or in combination of two or more.

The mixing ratio of the polymerization initiator with respect to 100 parts by mass of the total amount of the first reactive functional group-containing monomer, the ionic group-containing monomer, the polyoxyalkylene group-containing monomer, and the copolymerizable monomer is, for example, 0.1 parts by mass or more, preferably 2 parts by mass or more, and for example, 13 parts by mass or less, preferably 10 parts by mass or less.

The solvent is not particularly limited as long as it is stable with respect to the above-described monomers. Examples of the solvent include organic solvents such as petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetoamide, dimethylsulfoxide, N-methylpyrrolidone, and pyridine.

Examples of the solvent include aqueous solvents such as water; alcohol solvents including methanol, ethanol, propanol, isopropanol, and butanol; and glycol ether solvents including ethylene glycol monoethyl ether and propylene glycol monomethyl ether.

As the solvent, a commercially available product is also used. To be specific, as the petroleum-based hydrocarbon solvent, for example, AF Solvent No. 4 to No. 7 (hereinabove, manufactured by Nippon Oil Corporation) are used and as the aromatic hydrocarbon solvent, for example, Ink Solvent No. 0 (hereinabove, manufactured by Nippon Oil Corporation) and Solvesso 100, 150, and 200 manufactured by Exxon Mobil Corporation are used.

These solvents may be used alone or in combination of two or more.

The mixing ratio of the solvent is not particularly limited and is appropriately set in accordance with the purpose and intended use.

The polymerization conditions in the production of the polymer (a) are different, depending on the kind of the monomer, the polymerization initiator, and the solvent described above. The polymerization temperature is, for example, 30° C. or more, preferably 60° C. or more, and for example, 150° C. or less, preferably 120° C. or less. The polymerization time is, for example, 2 hours or more, preferably 4 hours or more, and for example, 20 hours or less, preferably 8 hours or less.

The polymer (a) thus obtained has a weight average molecular weight (in terms of polystyrene) of, for example, 2000 or more, preferably 3000 or more, and for example, 100000 or less, preferably 50000 or less.

When the weight average molecular weight of the polymer (a) is within the above-described range, the polymer (a) can be obtained with excellent productivity and improvement of the dispersibility of the metal fine particles can be achieved. Furthermore, improvement of various properties such as chemical resistance and hardness of the cured film obtained by curing the metal fine particle dispersion liquid containing the metal fine particle dispersant can be achieved.

A measurement method of the weight average molecular weight is in accordance with Examples to be described later.

The compound (b) that reacts with the above-described polymer (a) contains the second reactive functional group to be bonded to the first reactive functional group and an active energy ray curable group to be cured by an active energy ray.

The second reactive functional group is a functional group to be bonded to the first reactive functional group in the polymer (a) and is appropriately selected in accordance with the kind of the first reactive functional group.

To be specific, examples of the second reactive functional group include an isocyanate group, a carboxyl group, a hydroxyl group, a glycidyl group, and a phosphate group.

To be specific, when the first reactive functional group is a hydroxyl group, for example, as the second reactive functional group, an isocyanate group, which is a functional group bondable to the hydroxyl group, is selected.

When the first reactive functional group is a glycidyl group, for example, as the second reactive functional group, a carboxyl group and a phosphate group, which are a functional group bondable to the glycidyl group, are selected.

When the first reactive functional group is an isocyanate group, for example, as the second reactive functional group, a hydroxyl group, which is a functional group bondable to the isocyanate group, is selected.

When the first reactive functional group is a carboxyl group, for example, as the second reactive functional group, a glycidyl group, which is a functional group bondable to the carboxyl group, is selected.

When the first reactive functional group is a phosphate group, for example, as the second reactive functional group, a glycidyl group, which is a functional group bondable to the phosphate group, is selected.

As the second reactive functional group, in view of easy reaction, preferably, a carboxyl group, an isocyanate group, a glycidyl group, and a hydroxyl group are used, more preferably, an isocyanate group, a glycidyl group, and a hydroxyl group are used, or further more preferably, an isocyanate group and a hydroxyl group are used.

These second reactive functional groups may be used alone or in combination of two or more.

A second reactive functional group content is appropriately set in accordance with the purpose and intended use.

The active energy ray curable group is a functional group having an ethylenically double bond that exhibits curing properties by application of an active energy ray. To be specific, an example thereof includes a (meth)acryloyl group. (Meth)acryloyl includes acryloyl and methacryloyl.

An active energy ray curable group content with respect to 1 mol of the compound (b) is, for example, 1 mol or more, and for example, 6 mol or less, preferably 3 mol or less.

The active energy ray curable group content is appropriately selected in accordance with the purpose and intended use.

To be specific, examples of the compound (b) include isocyanate group-containing (meth)acrylate, α,β-unsaturated carboxylic acid, hydroxyl group-containing (meth)acrylate, glycidyl group-containing (meth)acrylate, and phosphate group-containing (meth)acrylate.

An example of the isocyanate group-containing (meth)acrylate includes the same isocyanate group-containing (meth)acrylate as that in the above-described first reactive functional group-containing monomer.

An example of the α,β-unsaturated carboxylic acid includes the same α,β-unsaturated carboxylic acid as that in the above-described first reactive functional group-containing monomer.

An example of the hydroxyl group-containing (meth)acrylate includes the same hydroxyl group-containing (meth)acrylate as that in the above-described first reactive functional group-containing monomer.

An example of the glycidyl group-containing (meth)acrylate includes the same glycidyl group-containing (meth)acrylate as that in the above-described first reactive functional group-containing monomer.

An example of the phosphate group-containing (meth)acrylate includes the same phosphate group-containing (meth)acrylate as that in the above-described first reactive functional group-containing monomer.

As the compound (b), preferably, isocyanate group-containing (meth)acrylate, α,β-unsaturated carboxylic acid, hydroxyl group-containing (meth)acrylate, and glycidyl group-containing (meth)acrylate are used, more preferably, isocyanate group-containing (meth)acrylate, hydroxyl group-containing (meth)acrylate, and glycidyl group-containing (meth)acrylate are used, or further more preferably, isocyanate group-containing (meth)acrylate and hydroxyl group-containing (meth)acrylate are used.

These compounds (b) may be used alone or in combination of two or more.

The reaction of the polymer (a) with the compound (b) is not particularly limited. For example, the polymer (a) is blended with the compound (b) to be heated under the presence of a known catalyst and solvent as needed.

The mixing ratio of the polymer (a) and the compound (b) on a molar basis is appropriately set so that the second reactive functional group in the compound (b) with respect to 1 mol of the first reactive functional group in the polymer (a) is, for example, 0.1 mol or more, preferably 0.8 mol or more, and for example, 2.0 mol or less, preferably 1.2 mol or less.

An example of the solvent includes the same solvent as that in the above-described synthesis of the polymer (a). As the solvent, preferably, the above-described organic solvent is used.

These solvents may be used alone or in combination of two or more.

In view of improvement of the working efficiency, preferably, the solvent used at the time of synthesizing the polymer (a) is used, as it is, as the solvent in the reaction of the polymer (a) with the compound (b).

The mixing ratio of the solvent is not particularly limited and is appropriately set in accordance with the purpose and intended use.

The heating temperature in the reaction of the polymer (a) with the compound (b) is, for example, 30° C. or more, preferably 60° C. or more, and for example, 130° C. or less, preferably 120° C. or less. The heating time is, for example, 1 hour or more, preferably 2 hours or more, and for example, 8 hours or less, preferably 5 hours or less.

By the reaction of the polymer (a) with the compound (b), the second reactive functional group is bonded to the first reactive functional group, thereby producing the metal fine particle dispersant.

The metal fine particle dispersant thus obtained has a weight average molecular weight (in terms of polystyrene) of, for example, 2000 or more, preferably 3000 or more, and for example, 100000 or less, preferably 50000 or less.

When the weight average molecular weight of the metal fine particle dispersant is within the above-described range, improvement of the dispersibility of the metal fine particles can be achieved and furthermore, improvement of various properties such as chemical resistance and hardness of the cured film obtained by curing the metal fine particle dispersion liquid containing the metal fine particle dispersant can be achieved.

A measurement method of the weight average molecular weight is in accordance with Examples to be described later.

The metal fine particle dispersant can be easily produced and is excellent in terms of low cost.

Furthermore, the metal fine particle dispersant has the polyoxyalkylene side chain contained in the polymer (a) and by the reaction of the first reactive functional group in the polymer (a) with the second reactive functional group in the compound (b), the active energy ray curable group is introduced thereto.

Thus, according to the metal fine particle dispersant, improvement of the dispersibility of the metal fine particles can be achieved and the metal fine particle dispersant can be cured by application of the active energy ray.

In the present invention, the metal fine particle dispersion liquid contains the above-described metal fine particle dispersant, the metal fine particles, and a dispersion medium.

The metal fine particles are not particularly limited. Examples thereof include fine particles of metal oxide such as aluminum oxide, titanium oxide, zinc oxide, zirconium oxide, tin oxide, yttrium oxide, bismuth oxide, antimony oxide, cerium oxide, and indium oxide and fine particles of heteroelement-doped metal oxide obtained by doping the metal oxide with heteroelements such as gallium, antimony, tin, fluorine, phosphorus, and aluminum. The crystal structure of the metal oxide is not particularly limited and may be, for example, any of cubic, tetragonal, orthorhombic, monoclinic, triclinic, hexagonal, or trigonal system.

As the metal fine particles, preferably, titanium oxide, zinc oxide, zirconium oxide, gallium-doped zinc oxide, and antimony-doped tin oxide are used.

The metal fine particles may be subjected to surface treatment by a known method as needed.

These metal fine particles may be used alone or in combination of two or more.

The shape of the metal fine particles is not particularly limited and examples of the shape thereof include massive shape, spherical shape, hallow shape, porous shape, rod shape, plate shape, fiber shape, amorphous shape, and a mixture thereof.

The particle size of the metal fine particles is measured as a primary particle size (distinguished from an average particle size to be described later) of the metal fine particles themselves and is, for example, 200 nm or less, preferably 90 nm or less, and usually 1 nm or more, preferably 3 nm or more.

When the primary particle size of the metal fine particles is within the above-described range, the metal fine particles are easy to obtain, and improvement of the storage stability of the metal fine particle dispersion liquid and the transparency of the cured film can be achieved.

By using the kind of the ionic group contained in the metal fine particle dispersant based on an electrical charge on the metal fine particle surface, transparency of the cured film can be further improved.

To be specific, when Zn-based metal fine particles (e.g., zinc oxide, gallium-doped zinc oxide, etc.) are used, preferably, as the ionic group, a tertiary amino group and a quaternary ammonium group are used. When Ti-based metal fine particles (e.g., titanium oxide subjected to surface treatment with Si, titanium oxide subjected to surface treatment with Zr and Al, etc.) or Zr-based metal fine particles (zirconium oxide etc.) is used, preferably, as the ionic group, a carboxyl group and a phosphate group are used.

The dispersion medium is not particularly limited and a known dispersion medium can be used. To be specific, an example thereof includes the same solvent as that in the reaction of the polymer (a) with the compound (b). Preferably, the above-described organic solvent is used.

These dispersion mediums may be used alone or in combination of two or more.

In view of improvement of the working efficiency, preferably, the solvent used at the time of reaction of the polymer (a) with the compound (b) is used, as it is, as the dispersion medium.

To prepare the metal fine particle dispersion liquid, the above-described components are blended and the metal fine particles are dispersed by a known dispersion method.

As the mixing ratio of the components in the metal fine particle dispersion liquid, with respect to 100 parts by mass of the metal fine particles, the mixing ratio of the metal fine particle dispersant is, for example, 1 part by mass or more, preferably 5 parts by mass or more, and for example, 200 parts by mass or less, preferably 100 parts by mass or less, further more preferably 70 parts by mass or less. Also, with respect to 100 parts by mass of the metal fine particle dispersion liquid, the mixing ratio of the metal fine particles is, for example, 0.5 parts by mass or more, preferably 2.5 parts by mass or more, and for example, 35 parts by mass or less, preferably 30 parts by mass or less.

The particle size of the metal fine particles in the metal fine particle dispersion liquid is measured as an average particle size thereof because the metal fine particles exist as primary particles and secondary particles. The particle size thereof is, for example, 200 nm or less, preferably 90 nm or less, and usually 1 nm or more, preferably 3 nm or more.

A measurement method of the average particle size is in accordance with Examples to be described later.

A dispersion method is not particularly limited and, for example, known dispersers such as a paint shaker, a roll mill, a ball mill, an attritor, a sand mill, a bead mill, and an ultrasonic disperser can be used.

When the metal fine particle dispersion liquid is used as a coating agent, in view of improvement of the coating properties, the coating stability, and the transparency of the cured film, preferably, a ball mill and a bead mill are used, or more preferably, a bead mill is used.

When the bead mill is used as a disperser, a known dispersing medium such as zirconia beads and glass beads can be used.

A bead size of the dispersing medium is not particularly limited and is, for example, 10 μm or more, and for example, 500 μm or less, preferably 100 μm or less. A filling rate of the dispersing medium is appropriately set in accordance with the purpose and intended use.

When the bead mill and the ball mill are used as a disperser, the metal fine particles are pulverized by the above-described dispersing medium and the average particle size thereof can be also adjusted to the above-described range. In such a case, metal fine particles having a larger average particle size than that of the above-described range can be put into the disperser.

A cross-linking agent can be, for example, blended in the metal fine particle dispersion liquid.

An example of the cross-linking agent includes polyfunctional (meth)acrylate.

The polyfunctional (meth)acrylate is a compound having, in one molecule, two or more (meth)acryloyl groups. To be specific, examples thereof include dipentaerythritol hexaacrylate, dipentaerythritol pentaacrylate, pentaerythritol tetraacrylate, pentaerythritol triacrylate, trimethylolpropane triacrylate, and ditrimethylolpropane tetraacrylate. Also, an example thereof includes polyfunctional urethane (meth)acrylate obtained by reaction of a polyfunctional (meth)acrylate oligomer having a hydroxyl group such as dipentaerythritol pentaacrylate and pentaerythritol triacrylate with a compound having, in one molecule, two or more isocyanate groups. These polyfunctional (meth)acrylates may be used alone or in combination of two or more. In view of hardness and excoriation resistance of the cured film, preferably, a compound having trifunctional or more (meth) acryloyl group is used.

These cross-linking agents may be used alone or in combination of two or more.

A mixing ratio of the cross-linking agent is appropriately set in accordance with the purpose and intended use.

A polymerization initiator can be, for example, blended in the metal fine particle dispersion liquid as needed.

Examples of the polymerization initiator include photopolymerization initiators such as 2,2-dimethoxy-1,2-diphenylethane-1-one, 1-hydroxycyclohexyl phenyl ketone, 1-cyclohexyl phenyl ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butanone-1, bis (2,4,6-trimethylbenzoyl)-phenylphosphine oxide, 2,4,6-trimethylbenzoyl-diphenyl-phosphine oxide, and 4-methylbenzophenone.

These polymerization initiators may be used alone or in combination of two or more.

The mixing ratio of the polymerization initiator with respect to 100 parts by mass of the total amount of the metal fine particle dispersant (and the cross-linking agent blended as needed) is, for example, 1 part by mass or more, preferably 2 parts by mass or more, and for example, 10 parts by mass or less, preferably 7 parts by mass or less.

Furthermore, various additives can be, for example, added to the metal fine particle dispersion liquid. Examples of the various additives include pigments, binder resins, drying agents, anticorrosive agents, plasticizers, coating film surface conditioners, antioxidants, ultraviolet absorbers, and furthermore, dispersants excluding the above-described metal fine particle dispersants (e.g., nonionic surfactants such as sorbitan fatty acid ester and polyethylene glycol fatty acid ester). A mixing ratio of the additive is appropriately set in accordance with the purpose and intended use.

Among all, the above-described metal fine particle dispersant has excellent compatibility with the binder resin and thus, the metal fine particle dispersion liquid containing the above-described metal fine particle dispersant can be preferably used in the fields such as various coatings and optical members.

The metal fine particle dispersion liquid has a non-volatile component of, for example, 0.5 mass % or more, preferably 3 mass % or more, and for example, 50 mass % or less, preferably 40 mass % or less.

The metal fine particle dispersion liquid contains the above-described metal fine particle dispersant, so that improvement of the dispersibility of the metal fine particles can be achieved and the metal fine particle dispersant can be cured by application of the active energy ray.

The cured film of the present invention obtained by curing the metal fine particle dispersion liquid has excellent various properties such as chemical resistance, hardness, furthermore, mechanical properties, and optical properties.

To obtain the cured film, for example, the metal fine particle dispersion liquid is used as a coating agent and is applied to a substrate by a known method to be then dried. Thereafter, an active energy ray is applied thereto to be cured.

The substrate is not particularly limited. Examples thereof include plastic such as polycarbonate, polymethyl methacrylate, polystyrene, polyester (polyethylene terephthalate etc.), polyolefin, epoxy resin, melamine resin, triacetyl cellulose resin, ABS resin, AS resin, and norbornene resin; metal; wood; paper; glass; and slate.

An application method is not particularly limited. Examples thereof include an application method using a generally available device at the time of application such as a roll coater, a bar coater, a doctor blade, a meyer bar, and an air knife and known application methods such as screen printing, offset printing, flexographic printing, brush coating, spray coating, gravure coating, and reverse gravure coating.

The drying conditions are as follows: a drying temperature of, for example, 40° C. or more, preferably 60° C. or more, and for example, 180° C. or less, preferably 140° C. or less and a drying time of, for example, 1 minute or more, preferably 3 minutes or more, and for example, 60 minutes or less, preferably 30 minutes or less.

The film thickness after drying is, for example, 50 nm or more, preferably 500 nm or more, and for example, 10 μm or less, preferably 7 nm or less.

Examples of the active energy ray include ultraviolet rays and electron rays.

In the case of curing by the ultraviolet rays, for example, an ultraviolet ray application device having a xenon lamp, a high-pressure mercury lamp, or a metal halide lamp as a light source is used. The ultraviolet radiation intensity, the light volume of the ultraviolet ray application device, the arrangement of the light source, and the like are appropriately adjusted as needed. To be specific, when a high-pressure mercury lamp is used, for example, a substrate to which the metal fine particle dispersion liquid is applied is conveyed with respect to one light having a light intensity of about 80 to 160 W/cm at a conveying rate of 5 to 50 m/min. The ultraviolet radiation intensity is, for example, 100 to 10000 mJ/cm$^2$. In the case of curing by the electron rays, a substrate to which the metal fine particle dispersion liquid is applied is conveyed with, for example, an electron ray accelerator having an accelerating voltage of 10 to 300 kV at a conveying rate of 5 to 50 m/min.

By application of the active energy ray, the active energy ray curable groups in the metal fine particle dispersant are cross-linked to form a three-dimensional structure. Thus, the cured film having excellent various properties such as chemical resistance and hardness and furthermore, having excellent mechanical properties and optical properties, to be specific, the cured film that is tough and has high transparency can be obtained.

Thus, the cured film can be, for example, preferably used in various industrial products as optical members such as light emitting diode (LED), lens, and optical device; fine ceramic; and functional coating films such as electrically conductive film and optical film.

EXAMPLES

While in the following, the present invention is described in further detail with reference to Examples and Comparative Examples, the present invention is not limited to any of them by no means. All designations of "part" or "parts" and "%" mean part or parts by mass and % by mass, respectively, unless otherwise particularly specified. The numeral values in Examples shown below can be replaced with the numeral values shown in the embodiments (that is, the upper limit value or the lower limit value).

A measurement method of properties used in Examples and Comparative Examples is shown below.

<Average Particle Size>

By using a laser light diffraction and scattering particle size distribution measuring device Nanotrac UPA-EX 150 (manufactured by NIKKISO CO., LTD.), the measurement was performed under the following conditions.

Measurement number: once
Measurement time: 180 seconds
Measurement temperature: 23° C.
Average particle size: value of cumulative 50% volume average particle size
Measurement solvent: dispersion medium used at the time of production of dispersion liquid
CI value: 0.4 to 0.8
Particle permeability: permeable
Sensitivity: standard
Filter: Stand:Norm
Nanometer range correction: invalid <Measurement of Weight Average Molecular Weight (Mw) with Gel Permeation Chromatography>

A sample was dissolved in tetrahydrofuran to be measured with gel permeation chromatograph (GPC) equipped with a refractive index detector (RID) with the sample concentration as 1.0 g/L, thereby obtaining molecular weight distribution of the sample.

Thereafter, the weight average molecular weight (Mw) of the sample was calculated from the obtained chromatogram (chart) with the standard polystyrene as a calibration curve. The measurement device and the measurement conditions are shown below.

Data processing apparatus: part number, "HLC-8220GPC" (manufactured by TOSOH CORPORATION)

Refractive index detector: RI detector built in part number, "HLC-8220GPC" Column: two pieces of part number, "TSKgel SuperHZM-H" (manufactured by TOSOH CORPORATION)

Mobile phase: tetrahydrofuran
Column flow rate: 0.35 mL/min
Sample concentration: 1.0 g/L
Injection amount: 10 µL
Measurement temperature: 40° C.
Molecular weight marker: standard polystyrene (reference material manufactured by POLYMER LABORATORIES LTD.) (using POLYSTYRENE-MEDIUM MOLECULAR WEIGHT CALIBRATION KIT)

<Measurement of Film Thickness of Cured Film>

A film thickness was measured by using a refractive film thickness monitor FE-3000 (manufactured by OTSUKA ELECTRONICS CO., LTD.).

<Metal Fine Particle Dispersant>

Example 1

A flask equipped with a stirrer, a condenser, a thermometer, an inert gas introducing pipe, and a dropping funnel was charged with 100 parts of propylene glycol monomethyl ether acetate and an inert gas (nitrogen gas) was introduced thereto to increase the temperature thereof at 100° C.

Thereafter, a mixture was dropped from the funnel over 2 hours, while being stirred. The mixture consisted of 20 parts of hydroxyethyl acrylate as a first reactive functional group-containing monomer; 16 parts of methacrylic acid as an ionic group-containing monomer; 16 parts of polyethylene glycol monoacrylate (mixture of tetraethylene glycol monoacrylate and pentaethylene glycol monoacrylate, manufactured by NOF CORPORATION, BLEMMER AE-200) as a polyoxyalkylene group-containing monomer; 16 parts of isobornyl methacrylate as a copolymerizable monomer (saturated alicyclic group-containing monomer containing a saturated alicyclic group composed of two or more rings); 16 parts of isostearyl methacrylate and 16 parts of styrene as another copolymerizable monomer; and 6 parts of t-butylperoxy-2-ethylhexanoate as a polymerization initiator. After 1 hour of mixing, 1 part of t-butylperoxy-2-ethylhexanoate as a polymerization initiator was added thereto to be then allowed to react for 3 hours. In this manner, a polymer (a) was obtained.

After termination of the reaction, the polymer (a) was cooled to 80° C., and 10.4 parts of 2-isocyanatoethyl acrylate as a compound (b) and 10.4 parts of propylene glycol monomethyl ether acetate as a solvent were dropped over 30 minutes to be then allowed to react at 80° C. for 3 hours.

In this manner, a metal fine particle dispersant having a weight average molecular weight of 8000 and a non-volatile component of 50% was obtained.

Examples 2 to 17 and Comparative Examples 1 to 5

Metal fine particle dispersants were obtained in the same manner as that in Example 1, except that the formulations were changed to those shown in Tables 1 and 2. The weight average molecular weight and the non-volatile component of each of the metal fine particle dispersants were shown in Tables 1 and 2.

<Metal Fine Particle Dispersion Liquid>

Example 18

The metal fine particle dispersant (7 parts) obtained in Example 1, 10 parts of metal fine particles shown in Table 3, 33 parts of propylene glycol monomethyl ether acetate as a solvent, and 150 parts of 50 µm zirconia bead as a dispersing medium were put into a 300 mL bottle. The metal fine particles were pulverized by using a disperser (manufactured by SEIWA GIKEN Co., Ltd., Rocking Shaker RS-05W) at 60 Hz for 10 hours, thereby dispersing the metal fine particles. Thereafter, the zirconia bead was removed by filtration, thereby obtaining metal fine particle dispersion liquids in which various metal fine particles were dispersed.

Each of the obtained metal fine particle dispersion liquids had a non-volatile component of 13.5 mass %. The average particle size of the metal fine particles was 30 nm.

Examples 19 to 34 and Comparative Examples 6 to 10

Metal fine particle dispersion liquids were obtained in the same manner as that in Example 18, except that the metal fine particle dispersants obtained in Examples 2 to 17 and Comparative Examples 1 to 5 were used and the metal fine particles shown in Tables 3 and 4 were used.

Each of the obtained metal fine particle dispersion liquids had a non-volatile component of 13.5 mass %. The average particle size of the metal fine particles was in the range of 20 to 80 nm.

Cured Film

Example 35

The metal fine particle dispersion liquid (100 parts) obtained in Example 18, 1 part of dipentaerythritol hexaacrylate as polyfunctional (meth)acrylate, and 0.2 parts of IRGACURE 184 (manufactured by Ciba Specialty Chemicals, 1-hydroxycyclohexyl phenyl ketone) as a polymerization initiator were blended, thereby obtaining a coating agent.

The obtained coating agent was applied to a polyethylene terephthalate film (manufactured by TOYOBO CO., LTD., COSMOSHINE A4300, thickness of 100 μm) as a substrate by using a bar coater so that the film thickness thereof after drying was 4 μm to be then dried at 60° C. for 5 minutes.

Next, 500 mJ/cm$^2$ of the ultraviolet ray was applied thereto with a high-pressure mercury lamp (light intensity of 120 W/cm) of an ultraviolet ray application device (manufactured by Japan Storage Battery Co., Ltd., device name, "CSOT-40") to be cured. In this manner, a cured film was obtained.

Examples 36 to 51 and Comparative Examples 11 to 15

Cured films were obtained in the same manner as that in Example 35, except that the metal fine particle dispersion liquids obtained in Examples 19 and 34 and Comparative Examples 6 to 10 were used.

<Evaluation>

(1) Dispersibility of Metal Fine Particle Dispersion Liquid

Each of the obtained metal fine particle dispersion liquids was allowed to stand still at 23° C. for 1 week to 2 months and the dispersibility of the metal fine particles was visually confirmed. The results are shown in Tables 3 and 4.

The reference of evaluation was described below.

Excellent: a precipitate was not confirmed in 2 months.

Good: a precipitate was not confirmed in 1 month, but a small amount of precipitate was confirmed in 2 months.

Poor: a small amount of precipitate was confirmed in 1 month.

Bad: a precipitate was confirmed in 1 week.

(2) Ethanol Resistance of Cured Film

Each of the obtained cured films was subjected to a rubbing test at a load of 1 kg by 10 times with BEMCOT sufficiently containing ethanol. The test conditions were set as 23° C. and a relative humidity of 50%. Thereafter, a state of each of the cured films was visually confirmed. The results are shown in Tables 3 and 4.

The reference of evaluation was described below.

Good: dissolution was not confirmed.

Poor: a surface was dissolved, but the base was not dissolved.

Bad: the base was dissolved.

(3) Alkali Resistance of Cured Film

Two drops of 2% or 5% sodium hydroxide aqueous solution was dropped to each of the obtained cured films to be allowed to stand at 23° C. for 10 minutes. Thereafter, it was wiped off with BEMCOT. Thereafter, a state of each of the cured films was visually confirmed. The results are shown in Tables 3 and 4.

The reference of evaluation was described below.

Excellent: in a test using a 2% or 5% sodium hydroxide aqueous solution, whitening or dissolution was not confirmed.

Good: in a test using a 2% sodium hydroxide aqueous solution, whitening or dissolution was not confirmed.

Poor: in a test using a 2% sodium hydroxide aqueous solution, the cured film was whitened.

Bad: in a test using a 2% sodium hydroxide aqueous solution, the cured film was dissolved.

(4) Hardness of Cured Film

The hardness (pencil hardness) of each of the obtained cured films was evaluated in accordance with JIS K 56005-4. The results are shown in Tables 3 and 4.

TABLE 1

| Example No. • Comparative Example No. | | | | Ex. 1 | Ex. 2 | Ex. 3 | Ex. 4 | Ex. 5 | Ex. 6 |
|---|---|---|---|---|---|---|---|---|---|
| Mixing Formulation (parts by mass) | Polymer (a) | First Reactive Functional Group-Containing Monomer | 2-hydroxyethyl methacrylate | — | — | 20 | 20 | 20 | 20 |
| | | | 2-hydroxyethyl acrylate | 20 | 20 | — | — | — | — |
| | | | 2-isocyanatoethyl acrylate | — | — | — | — | — | — |
| | | | methacrylic acid | — | — | — | — | — | — |
| | | Ionic Group-Containing Monomer | acrylic acid | — | — | 18 | — | — | — |
| | | | maleic acid | — | — | — | 3 | — | — |
| | | | dimethylaminoethyl methacrylate | — | — | — | — | 20 | — |
| | | | mono(2-hydroxyethyl methacrylate)phosphate | — | — | — | — | — | 14 |
| | | | methacrylic acid | 16 | 16 | — | — | — | — |
| | | Polyalkylene Oxide Group-Containing Monomer | polyethylene glycol monoacrylate* | 16 | 16 | 16 | 47 | 14 | 16 |
| | | | methoxynonaethylene glycol monomethacrylate | — | — | — | — | — | — |
| | | | pentapropylene glycol monomethacrylate | — | — | — | — | — | — |
| | | | tridecapropylene glycol monomethacrylate | — | — | — | — | — | — |
| | | | ethoxyethoxy ethyl acrylate | — | — | — | — | — | — |
| | | Copolymerizable Monomer | adamantyl acrylate | — | — | 16 | 20 | 46 | 20 |
| | | | isobornyl acrylate | 16 | 16 | — | — | — | — |
| | | | dicyclopentanyl acrylate | — | — | — | — | — | — |
| | | | methyl methacrylate | — | — | 14 | 5 | — | 14 |
| | | | styrene | 16 | 16 | 16 | 5 | — | 16 |
| | | | t-butyl methacrylate | — | — | — | — | — | — |
| | | | n-butyl acrylate | — | — | — | — | — | — |
| | | | isostearyl methacrylate | 16 | 16 | — | — | — | — |
| | | | isobutyl methacrylate | — | — | — | — | — | — |
| | | | cyclohexyl methacrylate | — | — | — | — | — | — |
| | | | behenyl methacrylate | — | — | — | — | — | — |
| | | | dodecyl methacrylate | — | — | — | — | — | — |
| | | | tetradecyl methacrylate | — | — | — | — | — | — |

TABLE 1-continued

| | | | | | | | | |
|---|---|---|---|---|---|---|---|---|
| Solvent (at the Time of Synthesis of Polymer (a)) | | propylene glycol monomethyl ether acetate | 100 | — | 100 | 100 | 100 | 100 |
| | | diisobutyl ketone | — | 100 | — | — | — | — |
| | | methyl ethyl ketone | — | — | — | — | — | — |
| Compound (b) | | 2-isocyanatoethyl acrylate | 10.4 | 10.4 | 7.6 | 7.6 | 7.6 | 3.8 |
| | | 2-hydroxyethyl acrylate | — | — | — | — | — | — |
| | | glycidyl methacrylate | — | — | — | — | — | — |
| Solvent (at the Time of Reaction of Compound (b)) | | propylene glycol monomethyl ether acetate | 10.4 | — | 7.6 | 7.6 | 7.6 | 3.8 |
| | | diisobutyl ketone | — | 10.4 | — | — | — | — |
| | | methyl ethyl ketone | — | — | — | — | — | — |
| Polymerization Initiator | Initial Charged Amount | t-butylperoxy-2-ethylhexanoate | 6 | 6 | 6 | 6 | 6 | 6 |
| | Additional Charged Amount | t-butylperoxy-2-ethylhexanoate | 1 | 1 | 1 | 1 | 1 | 1 |
| Weight Average Molecular Weight of Metal Fine Particle Dispersant | | | 8000 | 8000 | 7000 | 3500 | 12000 | 10000 |
| Non-Volatile Component (mass %) | | | 50 | 50 | 50 | 50 | 50 | 50 |

| | | | | Example No. • Comparative Example No. | Ex. 7 | Ex. 8 | Ex. 9 | Ex. 10 | Ex. 11 |
|---|---|---|---|---|---|---|---|---|---|
| Mixing Formulation (parts by mass) | Polymer (a) | First Reactive Functional Group-Containing Monomer | 2-hydroxyethyl methacrylate | | — | — | 35 | — | — |
| | | | 2-hydroxyethyl acrylate | | — | — | — | 20 | 1 |
| | | | 2-isocyanatoethyl acrylate | | 22 | — | — | — | — |
| | | | methacrylic acid | | — | 10 | — | — | — |
| | | Ionic Group-Containing Monomer | acrylic acid | | 18 | — | 20 | — | — |
| | | | maleic acid | | — | — | — | — | — |
| | | | dimethylaminoethyl methacrylate | | — | — | — | — | — |
| | | | mono(2-hydroxyethyl methacrylate)phosphate | | — | — | — | — | — |
| | | | methacrylic acid | | — | 10 | — | 16 | 20 |
| | | Polyalkylene Oxide Group-Containing Monomer | polyethylene glycol monoacrylate* | | — | — | — | — | — |
| | | | methoxynonaethylene glycol monomethacrylate | | 16 | — | — | — | 19 |
| | | | pentapropylene glycol monomethacrylate | | — | 10 | — | — | — |
| | | | tridecapropylene glycol monomethacrylate | | — | — | 20 | — | — |
| | | | ethoxyethoxy ethyl acrylate | | — | — | — | 16 | — |
| | | Copolymerizable Monomer | adamantyl acrylate | | — | — | 1 | — | — |
| | | | isobornyl acrylate | | 20 | — | — | 16 | 20 |
| | | | dicyclopentanyl acrylate | | — | 50 | — | — | — |
| | | | methyl methacrylate | | — | — | — | — | — |
| | | | styrene | | — | — | — | 16 | 20 |
| | | | t-butyl methacrylate | | 20 | — | — | — | — |
| | | | n-butyl acrylate | | 4 | — | — | — | — |
| | | | isostearyl methacrylate | | — | 10 | — | 16 | 20 |
| | | | isobutyl methacrylate | | — | 10 | — | — | — |
| | | | cyclohexyl methacrylate | | — | — | 24 | — | — |
| | | | behenyl methacrylate | | — | — | — | — | — |
| | | | dodecyl methacrylate | | — | — | — | — | — |
| | | | tetradecyl methacrylate | | — | — | — | — | — |
| | Solvent (at the Time of Synthesis of Polymer (a)) | | propylene glycol monomethyl ether acetate | | 100 | 100 | — | 100 | 100 |
| | | | diisobutyl ketone | | — | — | — | — | — |
| | | | methyl ethyl ketone | | — | — | 100 | — | — |
| | Compound (b) | | 2-isocyanatoethyl acrylate | | — | — | 38 | 10.4 | 1.2 |
| | | | 2-hydroxyethyl acrylate | | 18.1 | — | — | — | — |
| | | | glycidyl methacrylate | | — | 16.5 | — | — | — |
| | Solvent (at the Time of Reaction of Compound (b)) | | propylene glycol monomethyl ether acetate | | 18.1 | 16.5 | — | 10.4 | 1.2 |
| | | | diisobutyl ketone | | — | — | — | — | — |
| | | | methyl ethyl ketone | | — | — | 38 | — | — |
| | Polymerization Initiator | Initial Charged Amount | t-butylperoxy-2-ethylhexanoate | | 6 | 6 | 6 | 6 | 6 |
| | | Additional Charged Amount | t-butylperoxy-2-ethylhexanoate | | 1 | 1 | 1 | 1 | 1 |
| Weight Average Molecular Weight of Metal Fine Particle Dispersant | | | | | 8000 | 9000 | 15000 | 8000 | 5000 |
| Non-Volatile Component (mass %) | | | | | 50 | 50 | 50 | 50 | 50 |

*BLEMMER AE-200 (Manufactured by NOF Corporation)

TABLE 2

| Example No. • Comparative Example No. | | | | Ex. 12 | Ex. 13 | Ex. 14 | Ex. 15 | Ex. 16 | Ex. 17 |
|---|---|---|---|---|---|---|---|---|---|
| Mixing Formulation (parts by mass) | Polymer (a) | First Reactive Functional Group-Containing Monomer | 2-hydroxyethyl methacrylate | — | — | 20 | 20 | 35 | 20 |
| | | | 2-hydroxyethyl acrylate | 20 | — | — | — | — | — |
| | | | 2-isocyanatoethyl acrylate | — | — | — | — | — | — |
| | | | methacrylic acid | — | 10 | — | — | — | — |
| | | Ionic Group-Containing Monomer | acrylic acid | — | — | — | — | 20 | — |
| | | | maleic acid | — | — | 3 | 6 | — | — |
| | | | dimethylaminoethyl methacrylate | — | — | — | — | — | 20 |
| | | | mono(2-hydroxyethyl methacrylate)phosphate | — | — | — | — | — | — |
| | | | methacrylic acid | 16 | 10 | — | — | — | — |
| | | Polyalkylene Oxide Group-Containing Monomer | polyethylene glycol monoacrylate* | 16 | — | 28 | 47 | — | 14 |
| | | | methoxynonaethylene glycol monomethacryate | — | — | — | — | — | — |
| | | | pentapropylene glycol monomethacrylate | — | 0.7 | — | — | — | — |
| | | | tridecapropylene glycol monomethacrylate | — | — | — | — | 20 | — |
| | | | ethoxyethoxy ethyl acrylate | — | — | — | — | — | — |
| | | Copolymerizable Monomer | adamantyl acrylate | — | — | 20 | 20 | 5 | 38 |
| | | | isobornyl acrylate | — | — | — | — | — | — |
| | | | dicyclopentanyl acrylate | — | 50 | — | — | — | — |
| | | | methyl methacrylate | 16 | — | 5 | 5 | — | 8 |
| | | | styrene | 16 | — | 24 | 2 | — | — |
| | | | t-butyl methacrylate | — | — | — | — | — | — |
| | | | n-butyl acrylate | — | — | — | — | — | — |
| | | | isostearyl methacrylate | 16 | 10 | — | — | — | — |
| | | | isobutyl methacrylate | — | 19.3 | — | — | — | — |
| | | | cyclohexyl methacrylate | — | — | — | — | 20 | — |
| | | | behenyl methacrylate | — | — | — | — | — | — |
| | | | dodecyl methacrylate | — | — | — | — | — | — |
| | | | tetradecyl methacrylate | — | — | — | — | — | — |
| | Solvent (at the Time of Synthesis of Polymer (a)) | | propylene glycol monomethyl ether acetate | 100 | 100 | 100 | 100 | — | 100 |
| | | | diisobutyl ketone | — | — | — | — | — | — |
| | | | methyl ethyl ketone | — | — | — | — | 100 | — |
| | Compound (b) | | 2-isocyanatoethyl acrylate | 10.4 | — | 7.6 | 7.6 | 38 | 7.6 |
| | | | 2-hydroxyethyl acrylate | — | — | — | — | — | — |
| | | | glycidyl methacrylate | — | 16.5 | — | — | — | — |
| | Solvent (at the Time of Reaction of Compound (b)) | | propylene glycol monomethyl ether acetate | 10.4 | 16.5 | 7.6 | 7.6 | — | 7.6 |
| | | | diisobutyl ketone | — | — | — | — | — | — |
| | | | methyl ethyl ketone | — | — | — | — | 38 | — |
| | Polymerization Initiator | Initial Charged Amount | t-butylperoxy-2-ethylhexanoate | 6 | 6 | 6 | 6 | 6 | 6 |
| | | Additional Charged Amount | t-butylperoxy-2-ethylhexanoate | 1 | 1 | 1 | 1 | 1 | 1 |
| Weight Average Molecular Weight of Metal Fine Particle Dispersant | | | | 8000 | 9000 | 3500 | 3500 | 15000 | 12000 |
| Non-Volatile Component (mass %) | | | | 50 | 50 | 50 | 50 | 50 | 50 |

| Example No. • Comparative Example No. | | | | Comp. Ex. 1 | Comp. Ex. 2 | Comp. Ex. 3 |
|---|---|---|---|---|---|---|
| Mixing Formulation (parts by mass) | Polymer (a) | First Reactive Functional Group-Containing Monomer | 2-hydroxyethyl methacrylate | — | 20 | — |
| | | | 2-hydroxyethyl acrylate | 20 | — | — |
| | | | 2-isocyanatoethyl acrylate | — | — | — |
| | | | methacrylic acid | — | — | — |
| | | Ionic Group-Containing Monomer | acrylic acid | — | — | — |
| | | | maleic acid | — | — | — |
| | | | dimethylaminoethyl methacrylate | — | — | — |
| | | | mono(2-hydroxyethyl methacrylate)phosphate | — | — | — |
| | | | methacrylic acid | 16 | — | 1 |
| | | Polyalkylene Oxide Group-Containing Monomer | polyethylene glycol monoacrylate* | — | — | — |
| | | | methoxynonaethylene glycol monomethacryate | — | 40 | — |
| | | | pentapropylene glycol monomethacrylate | — | — | — |
| | | | tridecapropylene glycol monomethacrylate | — | — | — |
| | | | ethoxyethoxy ethyl acrylate | — | — | — |
| | | Copolymerizable Monomer | adamantyl acrylate | — | — | — |
| | | | isobornyl acrylate | 16 | 20 | 30 |
| | | | dicyclopentanyl acrylate | — | — | — |
| | | | methyl methacrylate | — | — | — |
| | | | styrene | — | — | 30 |

TABLE 2-continued

| | | | | | |
|---|---|---|---|---|---|
| | | t-butyl methacrylate | — | — | — |
| | | n-butyl acrylate | — | — | — |
| | | isostearyl methacrylate | — | — | — |
| | | isobutyl methacrylate | — | — | 19 |
| | | cyclohexyl methacrylate | — | — | — |
| | | behenyl methacrylate | 48 | 20 | — |
| | | dodecyl methacrylate | — | — | 15 |
| | | tetradecyl methacrylate | — | — | 5 |
| Solvent (at the Time of Synthesis of Polymer (a)) | | propylene glycol monomethyl ether acetate | 100 | 100 | 100 |
| | | diisobutyl ketone | — | — | — |
| | | methyl ethyl ketone | — | — | — |
| Compound (b) | | 2-isocyanatoethyl acrylate | 10.4 | 7.6 | — |
| | | 2-hydroxyethyl acrylate | — | — | — |
| | | glycidyl methacrylate | — | — | — |
| Solvent (at the Time of Reaction of Compound (b)) | | propylene glycol monomethyl ether acetate | 10.4 | 7.6 | — |
| | | diisobutyl ketone | — | — | — |
| | | methyl ethyl ketone | — | — | — |
| Polymerization Initiator | Initial Charged Amount | t-butylperoxy-2-ethylhexanoate | 6 | 6 | 5 |
| | Additional Charged Amount | t-butylperoxy-2-ethylhexanoate | 1 | 1 | 1 |
| Weight Average Molecular Weight of Metal Fine Particle Dispersant | | | 8000 | 8000 | 4000 |
| Non-Volatile Component (mass %) | | | 50 | 50 | 50 |

| | | | | Comp. Ex. 4 | Comp. Ex. 5 |
|---|---|---|---|---|---|
| Example No. • Comparative Example No. | | | | | |
| Mixing Formulation (parts by mass) | Polymer (a) | First Reactive Functional Group-Containing Monomer | 2-hydroxyethyl methacrylate | 20 | — |
| | | | 2-hydroxyethyl acrylate | — | — |
| | | | 2-isocyanatoethyl acrylate | — | — |
| | | | methacrylic acid | — | — |
| | | Ionic Group-Containing Monomer | acrylic acid | — | — |
| | | | maleic acid | — | — |
| | | | dimethylaminoethyl methacrylate | 20 | — |
| | | | mono(2-hydroxyethyl methacrylate)phosphate | — | — |
| | | | methacrylic acid | — | 16 |
| | | Polyalkylene Oxide Group-Containing Monomer | polyethylene glycol monoacrylate* | — | 16 |
| | | | methoxynonaethylene glycol monomethacryate | — | — |
| | | | pentapropylene glycol monomethacrylate | — | — |
| | | | tridecapropylene glycol monomethacrylate | — | — |
| | | | ethoxyethoxy ethyl acrylate | — | — |
| | | Copolymerizable Monomer | adamantyl acrylate | 46 | — |
| | | | isobornyl acrylate | — | 36 |
| | | | dicyclopentanyl acrylate | — | — |
| | | | methyl methacrylate | — | — |
| | | | styrene | — | 16 |
| | | | t-butyl methacrylate | — | — |
| | | | n-butyl acrylate | — | — |
| | | | isostearyl methacrylate | — | 16 |
| | | | isobutyl methacrylate | — | — |
| | | | cyclohexyl methacrylate | — | — |
| | | | behenyl methacrylate | — | — |
| | | | dodecyl methacrylate | 11 | — |
| | | | tetradecyl methacrylate | 3 | — |
| | Solvent (at the Time of Synthesis of Polymer (a)) | | propylene glycol monomethyl ether acetate | 100 | 100 |
| | | | diisobutyl ketone | — | — |
| | | | methyl ethyl ketone | — | — |
| | Compound (b) | | 2-isocyanatoethyl acrylate | 7.6 | — |
| | | | 2-hydroxyethyl acrylate | — | — |
| | | | glycidyl methacrylate | — | — |
| | Solvent (at the Time of Reaction of Compound (b)) | | propylene glycol monomethyl ether acetate | 7.6 | — |
| | | | diisobutyl ketone | — | — |
| | | | methyl ethyl ketone | — | — |
| | Polymerization Initiator | Initial Charged Amount | t-butylperoxy-2-ethylhexanoate | 6 | 6 |
| | | Additional Charged Amount | t-butylperoxy-2-ethylhexanoate | 1 | 1 |
| Weight Average Molecular Weight of Metal Fine Particle Dispersant | | | | 10000 | 10000 |
| Non-Volatile Component (mass %) | | | | 50 | 50 |

*BLEMMER AE-200 (Manufactured by NOF Corporation)

TABLE 3

| Metal Fine Particle Dispersion Liquid | Example No. • Comparative Example No. | | Ex. 18 | Ex. 19 | Ex. 20 | Ex. 21 | Ex. 22 | Ex. 23 |
|---|---|---|---|---|---|---|---|---|
| Metal Fine Particle Dispersant | | | Ex. 1 | Ex. 2 | Ex. 3 | Ex. 4 | Ex. 5 | Ex. 6 |
| Evaluation | Dispersibility | MT-100WP | Good | Good | Good | Good | — | Good |
| | | MT-100HD | Excellent | Excellent | Excellent | Good | — | Excellent |
| | | TTO-51A | Good | Good | Good | Good | — | Good |
| | | TTO-51C | Excellent | Excellent | Excellent | Good | — | Excellent |
| | | Zirconium Oxide | Excellent | Excellent | Excellent | Good | — | Excellent |
| | | Zinc Oxide | — | — | — | — | Good | — |
| | | Gallium-Doped Zinc Oxide | — | — | — | — | Good | — |
| | | Antimony-Doped Tin Oxide | Excellent | Excellent | Good | Good | — | Good |
| Cured Film | Example No. • Comparative Example No. | | Ex. 35 | Ex. 36 | Ex. 37 | Ex. 38 | Ex. 39 | Ex. 40 |
| Evaluation | Ethanol Resistance | MT-100WP | Good | Good | Good | Good | — | Good |
| | | MT-100HD | Good | Good | Good | Good | — | Good |
| | | TTO-51A | Good | Good | Good | Good | — | Good |
| | | TTO-51C | Good | Good | Good | Good | — | Good |
| | | Zirconium Oxide | Good | Good | Good | Good | — | Good |
| | | Zinc Oxide | — | — | — | — | Good | — |
| | | Gallium-Doped Zinc Oxide | — | — | — | — | Good | — |
| | | Antimony-Doped Tin Oxide | Good | Good | Good | Good | — | Good |
| | Alkali Resistance | MT-100WP | Good | Good | Good | Good | — | Good |
| | | MT-100HD | Excellent | Excellent | Excellent | Good | — | Good |
| | | TTO-51A | Good | Good | Good | Good | — | Good |
| | | TTO-51C | Excellent | Excellent | Excellent | Good | — | Good |
| | | Zirconium Oxide | Excellent | Excellent | Excellent | Excellent | — | Good |
| | | Zinc Oxide | — | — | — | — | Good | — |
| | | Gallium-Doped Zinc Oxide | — | — | — | — | Good | — |
| | | Antimony-Doped Tin Oxide | Good | Good | Good | Good | — | Good |
| | Pencil Hardness | MT-100WP | 3H | 3H | 3H | 2H | — | 3H |
| | | MT-100HD | 3H | 3H | 3H | 2H | — | 3H |
| | | TTO-51A | 3H | 3H | 3H | 2H | — | 3H |
| | | TTO-51C | 3H | 3H | 3H | 2H | — | 3H |
| | | Zirconium Oxide | 3H | 3H | 3H | 2H | — | 3H |
| | | Zinc Oxide | — | — | — | — | 3H | — |
| | | Gallium-Doped Zinc Oxide | — | — | — | — | 3H | — |
| | | Antimony-Doped Tin Oxide | 3H | 3H | 3H | 2H | — | 3H |
| Metal Fine Particle Dispersion Liquid | Example No. • Comparative Example No. | | Ex. 24 | Ex. 25 | Ex. 26 | Ex. 27 | Ex. 28 | |
| Metal Fine Particle Dispersant | | | Ex. 7 | Ex. 8 | Ex. 9 | Ex. 10 | Ex. 11 | |
| Evaluation | Dispersibility | MT-100WP | Good | Good | Poor | Poor | Good | |
| | | MT-100HD | Good | Good | Good | Poor | Good | |
| | | TTO-51A | Good | Good | Poor | Poor | Good | |
| | | TTO-51C | Good | Good | Good | Poor | Excellent | |
| | | Zirconium Oxide | Good | Excellent | Good | Good | Excellent | |
| | | Zinc Oxide | — | — | — | — | — | |
| | | Gallium-Doped Zinc Oxide | — | — | — | — | — | |
| | | Antimony-Doped Tin Oxide | Good | Good | Poor | Poor | Good | |
| Cured Film | Example No. • Comparative Example No. | | Ex. 41 | Ex. 42 | Ex. 43 | Ex. 44 | Ex. 45 | |
| Evaluation | Ethanol Resistance | MT-100WP | Good | Good | Good | Poor | Good | |
| | | MT-100HD | Good | Good | Good | Poor | Good | |
| | | TTO-51A | Good | Good | Good | Good | Good | |
| | | TTO-51C | Good | Good | Good | Poor | Good | |
| | | Zirconium Oxide | Good | Good | Good | Good | Poor | |
| | | Zinc Oxide | — | — | — | — | — | |
| | | Gallium-Doped Zinc Oxide | — | — | — | — | — | |
| | | Antimony-Doped Tin Oxide | Good | Good | Good | Poor | Good | |
| | Alkali Resistance | MT-100WP | Good | Good | Poor | Good | Poor | |
| | | MT-100HD | Good | Excellent | Good | Good | Good | |
| | | TTO-51A | Good | Good | Poor | Good | Poor | |
| | | TTO-51C | Good | Excellent | Good | Good | Good | |
| | | Zirconium Oxide | Good | Excellent | Good | Good | Good | |

TABLE 3-continued

|  |  |  |  |  |  |  |  |
|---|---|---|---|---|---|---|---|
|  |  | Zinc Oxide | — | — | — | — | — |
|  |  | Gallium-Doped Zinc Oxide | — | — | — | — | — |
|  |  | Antimony-Doped Tin Oxide | Good | Good | Good | Good | Good |
|  | Pencil Hardness | MT-100WP | 3H | 3H | 3H | 3H | 2H |
|  |  | MT-100HD | 3H | 3H | 3H | 3H | 3H |
|  |  | TTO-51A | 3H | 3H | 3H | 2H | 2H |
|  |  | TTO-51C | 3H | 3H | 3H | 2H | 3H |
|  |  | Zirconium Oxide | 3H | 3H | 3H | 3H | 3H |
|  |  | Zinc Oxide | — | — | — | — | — |
|  |  | Gallium-Doped Zinc Oxide | — | — | — | — | — |
|  |  | Antimony-Doped Tin Oxide | 3H | 3H | 3H | 2H | 3H |

TABLE 4

| Metal Fine Particle Dispersion Liquid | Example No. • Comparative Example No. |  | Ex. 29 | Ex. 30 | Ex. 31 | Ex. 32 | Ex. 33 |
|---|---|---|---|---|---|---|---|
| Metal Fine Particle Dispersant |  |  | Ex. 12 | Ex. 13 | Ex. 14 | Ex. 15 | Ex. 16 |
| Evaluation | Dispersibility | MT-100WP | Poor | Poor | Good | Good | Good |
|  |  | MT-100HD | Good | Good | Good | Excellent | Good |
|  |  | TTO-51A | Good | Poor | Good | Good | Good |
|  |  | TTO-51C | Good | Good | Good | Excellent | Excellent |
|  |  | Zirconium Oxide | Good | Good | Excellent | Excellent | Excellent |
|  |  | Zinc Oxide | — | — | — | — | — |
|  |  | Gallium-Doped Zinc Oxide | — | — | — | — | — |
|  |  | Antimony-Doped Tin Oxide | Good | Good | Good | Excellent | Good |
| Cured Film | Example No. • Comparative Example No. |  | Ex. 46 | Ex. 47 | Ex. 48 | Ex. 49 | Ex. 50 |
| Evaluation | Ethanol Resistance | MT-100WP | Poor | Poor | Good | Good | Good |
|  |  | MT-100HD | Good | Good | Good | Good | Good |
|  |  | TTO-51A | Good | Poor | Good | Good | Good |
|  |  | TTO-51C | Good | Good | Good | Good | Good |
|  |  | Zirconium Oxide | Good | Good | Good | Good | Good |
|  |  | Zinc Oxide | — | — | — | — | — |
|  |  | Gallium-Doped Zinc Oxide | — | — | — | — | — |
|  |  | Antimony-Doped Tin Oxide | Good | Good | Good | Good | Good |
|  | Alkali Resistance | MT-100WP | Good | Good | Good | Good | Good |
|  |  | MT-100HD | Good | Good | Excellent | Good | Good |
|  |  | TTO-51A | Good | Good | Good | Good | Good |
|  |  | TTO-51C | Good | Good | Excellent | Good | Good |
|  |  | Zirconium Oxide | Good | Excellent | Excellent | Excellent | Good |
|  |  | Zinc Oxide | — | — | — | — | — |
|  |  | Gallium-Doped Zinc Oxide | — | — | — | — | — |
|  |  | Antimony-Doped Tin Oxide | Good | Good | Good | Good | Good |
|  | Pencil Hardness | MT-100WP | 3H | 3H | 3H | 2H | 3H |
|  |  | MT-100HD | 3H | 3H | 3H | 3H | 3H |
|  |  | TTO-51A | 3H | 3H | 3H | 2H | 3H |
|  |  | TTO-51C | 3H | 3H | 3H | 3H | 3H |
|  |  | Zirconium Oxide | 3H | 3H | 3H | 2H | 3H |
|  |  | Zinc Oxide | — | — | — | — | — |
|  |  | Gallium-Doped Zinc Oxide | — | — | — | — | — |
|  |  | Antimony-Doped Tin Oxide | 3H | 3H | 3H | 2H | 3H |
| Metal Fine Particle Dispersion Liquid | Example No. • Comparative Example No. |  | Ex. 34 | Comp. Ex. 6 | Comp. Ex. 7 |  |  |
| Metal Fine Particle Dispersant |  |  | Ex. 17 | Comp. Ex. 1 | Comp. Ex. 2 |  |  |
| Evaluation | Dispersibility | MT-100WP | — | Bad | Bad |  |  |
|  |  | MT-100HD | — | Poor | Bad |  |  |
|  |  | TTO-51A | — | Bad | Bad |  |  |
|  |  | TTO-51C | — | Poor | Bad |  |  |
|  |  | Zirconium Oxide | — | Poor | Bad |  |  |
|  |  | Zinc Oxide | Excellent | — | — |  |  |
|  |  | Gallium-Doped Zinc Oxide | Excellent | — | — |  |  |
|  |  | Antimony-Doped Tin Oxide | — | Bad | Bad |  |  |
| Cured Film | Example No. • Comparative Example No. |  | Ex. 51 | Comp. Ex. 11 | Comp. Ex. 12 |  |  |
| Evaluation | Ethanol Resistance | MT-100WP | — | Bad | Bad |  |  |
|  |  | MT-100HD | — | Bad | Poor |  |  |
|  |  | TTO-51A | — | Poor | Bad |  |  |
|  |  | TTO-51C | — | Bad | Poor |  |  |

TABLE 4-continued

|  |  |  |  |  |  |
|---|---|---|---|---|---|
|  |  | Zirconium Oxide | — | Poor | Poor |
|  |  | Zinc Oxide | Good | — | — |
|  |  | Gallium-Doped Zinc Oxide | Good | — | — |
|  |  | Antimony-Doped Tin Oxide | — | Bad | Bad |
|  | Alkali Resistance | MT-100WP | — | Poor | Poor |
|  |  | MT-100HD | — | Good | Good |
|  |  | TTO-51A | — | Poor | Poor |
|  |  | TTO-51C | — | Good | Good |
|  |  | Zirconium Oxide | — | Poor | Poor |
|  |  | Zinc Oxide | Good | — | — |
|  |  | Gallium-Doped Zinc Oxide | Good | — | — |
|  |  | Antimony-Doped Tin Oxide | — | Poor | Poor |
|  | Pencil Hardness | MT-100WP | — | 2H | 2H |
|  |  | MT-100HD | — | 3H | 3H |
|  |  | TTO-51A | — | 2H | 2H |
|  |  | TTO-51C | — | 3H | 3H |
|  |  | Zirconium Oxide | — | 3H | 2H |
|  |  | Zinc Oxide | 3H | — | — |
|  |  | Gallium-Doped Zinc Oxide | 3H | — | — |
|  |  | Antimony-Doped Tin Oxide | — | 2H | 2H |

| Metal Fine Particle Dispersion Liquid | Example No. • Comparative Example No. |  | Comp. Ex. 8 | Comp. Ex. 9 | Comp. Ex. 10 |
|---|---|---|---|---|---|
| Metal Fine Particle Dispersant |  |  | Comp. Ex. 3 | Comp. Ex. 4 | Comp. Ex. 5 |
| Evaluation | Dispersibility | MT-100WP | Bad | — | Poor |
|  |  | MT-100HD | Bad | — | Good |
|  |  | TTO-51A | Bad | — | Poor |
|  |  | TTO-51C | Bad | — | Good |
|  |  | Zirconium Oxide | Bad | — | Good |
|  |  | Zinc Oxide | — | Bad | — |
|  |  | Gallium-Doped Zinc Oxide | — | Bad | — |
|  |  | Antimony-Doped Tin Oxide | Bad | — | Good |

| Cured Film | Example No. • Comparative Example No. |  | Comp. Ex. 13 | Comp. Ex. 14 | Comp. Ex. 15 |
|---|---|---|---|---|---|
| Evaluation | Ethanol Resistance | MT-100WP | Bad | — | Bad |
|  |  | MT-100HD | Bad | — | Bad |
|  |  | TTO-51A | Bad | — | Bad |
|  |  | TTO-51C | Bad | — | Bad |
|  |  | Zirconium Oxide | Bad | — | Bad |
|  |  | Zinc Oxide | — | Bad | — |
|  |  | Gallium-Doped Zinc Oxide | — | Bad | — |
|  |  | Antimony-Doped Tin Oxide | Bad | — | Bad |
|  | Alkali Resistance | MT-100WP | Bad | — | Bad |
|  |  | MT-100HD | Bad | — | Bad |
|  |  | TTO-51A | Bad | — | Bad |
|  |  | TTO-51C | Bad | — | Bad |
|  |  | Zirconium Oxide | Bad | — | Bad |
|  |  | Zinc Oxide | — | Poor | — |
|  |  | Gallium-Doped Zinc Oxide | — | Poor | — |
|  |  | Antimony-Doped Tin Oxide | Bad | — | Bad |
|  | Pencil Hardness | MT-100WP | H | — | H |
|  |  | MT-100HD | H | — | H |
|  |  | TTO-51A | H | — | H |
|  |  | TTO-51C | H | — | H |
|  |  | Zirconium Oxide | H | — | H |
|  |  | Zinc Oxide | — | 3H | — |
|  |  | Gallium-Doped Zinc Oxide | — | 2H | — |
|  |  | Antimony-Doped Tin Oxide | H | — | H |

The abbreviations in the Tables are shown below.

MT-100WP: titanium oxide subjected to surface treatment with Si (manufactured by TAYCA CORPORATION)

MT-100HD: titanium oxide subjected to surface treatment with Zr and Al (manufactured by TAYCA CORPORATION)

TTO-51A: titanium oxide subjected to surface treatment with Al(OH)$_3$ (manufactured by ISHIHARA SANGYO KAISHA, LTD.)

TTO-51C: titanium oxide subjected to surface treatment with Al(OH)$_3$ and isostearic acid (manufactured by ISHIHARA SANGYO KAISHA, LTD.)

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The metal fine particle dispersant of the present invention and the metal fine particle dispersion liquid prepared by dispersing the metal fine particles by the metal fine particle dispersant are used in formation of the cured film. The cured film is, for example, used in various industrial products as optical members such as light emitting diode (LED), lens, and optical device; fine ceramic; and functional coating films such as electrically conductive film and optical film.

The invention claimed is:

1. A metal fine particle dispersant obtained by reaction of a polymer (a) with a compound (b), wherein
the polymer (a) contains
a first reactive functional group,
an ionic group to be absorbed to metal fine particles, and
a polyoxyalkylene side chain and
the compound (b) contains
a second reactive functional group to be bonded to the first reactive functional group and
an active energy ray curable group to be cured by an active energy ray,
the polymer (a) is obtained by allowing
a first reactive functional group-containing monomer containing the first reactive functional group,
an ionic group-containing monomer containing the ionic group,
a polyoxyalkylene group-containing monomer containing a polyoxyalkylene group, and
a copolymerizable monomer copolymerizable with these to react and
with respect to 100 parts by mass of the total amount of the first reactive functional group-containing monomer, the ionic group-containing monomer, the polyoxyalkylene group-containing monomer, and the copolymerizable monomer,
the mixing ratio of the first reactive functional group-containing monomer is 1 part by mass or more and 35 parts by mass or less;
the mixing ratio of the ionic group-containing monomer is 1 part by mass or more and 20 parts by mass or less; and
the mixing ratio of the polyoxyalkylene group-containing monomer is 0.1 parts by mass or more and 50 parts by mass or less.

2. The metal fine particle dispersant according to claim 1, wherein
the first reactive functional group is at least one kind selected from the group consisting of a hydroxyl group, a glycidyl group, an isocyanate group, a carboxyl group, and a phosphate group and
the second reactive functional group is at least one kind selected from the group consisting of an isocyanate group, a carboxyl group, a hydroxyl group, a glycidyl group, and a phosphate group.

3. The metal fine particle dispersant according to claim 1, wherein
the ionic group is at least one kind selected from the group consisting of a carboxyl group, a tertiary amino group, a quaternary ammonium group, and a phosphate group.

4. The metal fine particle dispersant according to claim 1, wherein
the polymer (a) is an acrylic polymer.

5. The metal fine particle dispersant according to claim 1, wherein
the copolymerizable monomer contains
a saturated alicyclic group-containing monomer containing a saturated alicyclic group composed of two or more rings and
with respect to 100 parts by mass of the total amount of the first reactive functional group-containing monomer, the ionic group-containing monomer, the polyoxyalkylene group-containing monomer, and the copolymerizable monomer,
the mixing ratio of the saturated alicyclic group-containing monomer is 0.1 parts by mass or more and 50 parts by mass or less.

6. A metal fine particle dispersion liquid containing:
the metal fine particle dispersant according to claim 1,
metal fine particles, and
a dispersion medium.

7. A cured film obtained by curing of a metal fine particle dispersion liquid, wherein
the metal fine particle dispersion liquid contains:
the metal fine particle dispersant according to claim 1,
metal fine particles, and
a dispersion medium.

* * * * *

UNITED STATES PATENT AND TRADEMARK OFFICE
CERTIFICATE OF CORRECTION

PATENT NO. : 9,546,234 B2
APPLICATION NO. : 14/770677
DATED : January 17, 2017
INVENTOR(S) : Yutaka Kitajima et al.

Page 1 of 2

It is certified that error appears in the above-identified patent and that said Letters Patent is hereby corrected as shown below:

In the Specification

Column 2, Lines 37-40: delete "Examples of the azo compound include azobisisobutyronitrile, azobisdimethylvaleronitrile, azobiscyclohexanenitrile, 1,1'-azobis(1-acetoxy-1-phenylethane), dimethyl-2,2'-azobisisobutyrate, and 4,4'-azobis-4-cyanovaleric acid."

Column 2, after Line 40: insert --In the metal fine particle dispersant of the present invention, it is preferable that the ionic group is at least one kind selected from the group consisting of a carboxyl group, a tertiary amino group, a quaternary ammonium group, and a phosphate group.--

Column 3, after Line 6: insert --A cured film of the present invention is obtained by curing of the above-described metal fine particle dispersion liquid.
EFFECT OF THE INVENTION--

Column 3, after Line 6: delete "The solvent is not particularly limited as long as it is stable with respect to the above-described monomers. Examples of the solvent include organic solvents such as petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetamide, dimethylsulfoxide, N-methylpyrrolidone, and pyridine."

Column 11, Lines 41-44: change "Examples of the azo compound include azobisisobutyronitrile, azobisdimethylvaleronitrile, azobiscyclohexanenitrile, 1,1'-azobis(1-acetoxy-1-phenylethane), dimethyl-2,2'-azobisisobutylate, and 4,4'-azobis-4-cyanovaleric acid." to --Examples of the azo compound include azobisisobutyronitrile, azobisdimethylvaleronitrile, azobiscyclohexanenitrile,

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,546,234 B2

1,1'-azobis(1-acetoxy-1-phenylethane), dimethyl-2,2'-azobisisobutyrate, and 4,4'-azobis-4-cyanovaleric acid.--

Column 12, Lines 9-21: change "The solvent is not particularly limited as long as it is stable with respect to the above-described monomers. Examples of the solvent include organic solvents such as petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetoamide, dimethylsulfoxide, N-methylpyrrolidone, and pyridine." to --The solvent is not particularly limited as long as it is stable with respect to the above-described monomers. Examples of the solvent include organic solvents such as petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetamide, dimethylsulfoxide, N-methylpyrrolidone, and pyridine.--

Column 18, Lines 19-21: change "The film thickness after drying is, for example, 50 nm or more, preferably 500 nm or more, and for example, 10 μm or less, preferably 7 nm or less." to --The film thickness after drying is, for example, 50 nm or more, preferably 500 nm or more, and for example, 10 μm or less, preferably 7 μm or less.--